US 7,596,322 B2

(12) United States Patent
Tomaru et al.

(10) Patent No.: US 7,596,322 B2
(45) Date of Patent: Sep. 29, 2009

(54) CRYPTOGRAPHIC-KEY-GENERATION COMMUNICATION SYSTEM

(75) Inventors: Tatsuya Tomaru, Hatoyama (JP); Shinya Sasaki, Koganei (JP); Kiyotaka Hammura, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 531 days.

(21) Appl. No.: 11/350,086

(22) Filed: Feb. 9, 2006

(65) Prior Publication Data
US 2006/0280509 A1 Dec. 14, 2006

(30) Foreign Application Priority Data
Jun. 10, 2005 (JP) ............................. 2005-170663

(51) Int. Cl.
*H04B 10/12* (2006.01)
*H04B 10/06* (2006.01)

(52) U.S. Cl. ..................... 398/140; 398/162; 398/182; 398/183; 398/188; 398/202; 398/212; 398/214; 380/255; 380/256

(58) Field of Classification Search .............. 380/256, 380/255; 398/140, 162, 182, 183, 188, 202, 398/212, 214
See application file for complete search history.

(56) References Cited

U.S. PATENT DOCUMENTS

| 5,307,410 | A | 4/1994 | Bennett | |
|---|---|---|---|---|
| 7,259,901 | B2 * | 8/2007 | Parsons et al. | 359/237 |
| 2004/0032954 | A1 * | 2/2004 | Bonfrate et al. | 380/263 |
| 2004/0190719 | A1 | 9/2004 | Lo | |
| 2005/0078827 | A1 * | 4/2005 | Tajima | 380/256 |
| 2006/0088159 | A1 * | 4/2006 | Mitchell et al. | 380/46 |

FOREIGN PATENT DOCUMENTS

GB 2 392 063 A 5/2002

OTHER PUBLICATIONS

Muller, A. et al., "Plug and Play Systems for Quantum Cryptography", Applied Physics Letters, vol. 70, No. 7, American Institute of Physics, (Feb. 17, 1997), pp. 793-795.

(Continued)

*Primary Examiner*—Ken N Vanderpuye
*Assistant Examiner*—Daniel G Dobson
(74) *Attorney, Agent, or Firm*—Stites & Harbison PLLC; Juan Carlos A. Marquez, Esq.

(57) ABSTRACT

In a cryptographic key distribution system by the phase modulation using a single photon state or a faint LD light, there is required an interferometer independent on polarization and stabilized against thermal fluctuations in order to make a transmission distance longer. Cryptographic key distribution systems are generally low in cryptographic-key-generating efficiency, and an improvement in the efficiency is demanded. In the present invention, two interferometers are disposed within the receiver so as to require no phase modulator within the receiver, thereby achieving a polarization-independent receiver. The pulses are paired, and the signal is transmitted with the relative phase, and the interval of the paired pulses is sufficiently reduced to set the optical path within the interferometer in the receiver to be smaller, thereby achieving the interferometer stabilized against thermal fluctuations. The transmission rate is set sufficiently larger than the average detection rate, and only a part of the transmitted random numbers is detected at random. This reduces a probability that an eavesdropper and a regular recipient observe data at the same slot.

18 Claims, 13 Drawing Sheets

OTHER PUBLICATIONS

Zbinden, H. et al., "Quantum Cryptography", Applied Physics B, vol. 67, (1998), pp. 743-748.

Kyo Inoue et al., "Differential Phase Shift Quantum Key Distribution", Physical Review Letters, vol. 89, No. 3, The American Physical Society, (Jul. 15, 2002), pp. 037902-1—037902-3.

Inoue, K. et al., "Differential-Phase-Shift Quantum Key Distribution Using Coherent Light", Physical Review A 68, The American Physical Society, (2003), pp. 022317-1—022317-4.

Yoshihiro Nambu et al., "BB84 Quantum Key Distribution System Based on Silica-Based Planar Lightwave Circuits", Japanese Journal of Applied Physics, vol. 43, No. 8B, (2004), pp. L1109-L1110.

Nicolas Gisin et al., "Quantum Cryptography", Reviews of Modern Physics, vol. 74, (Jan. 2002), pp. 145-195.

Extended European Search Report for 06002271.2—1525, dated May 16, 2008.

K. Inoue et al.; "Differential-Phase-Shift Quantum Key Distribution Using Coherent Light"; Physical Review, Volume A, No. 68, 2003, pp. 022317-1 to 022317-4.

* cited by examiner

*Fig. 1*
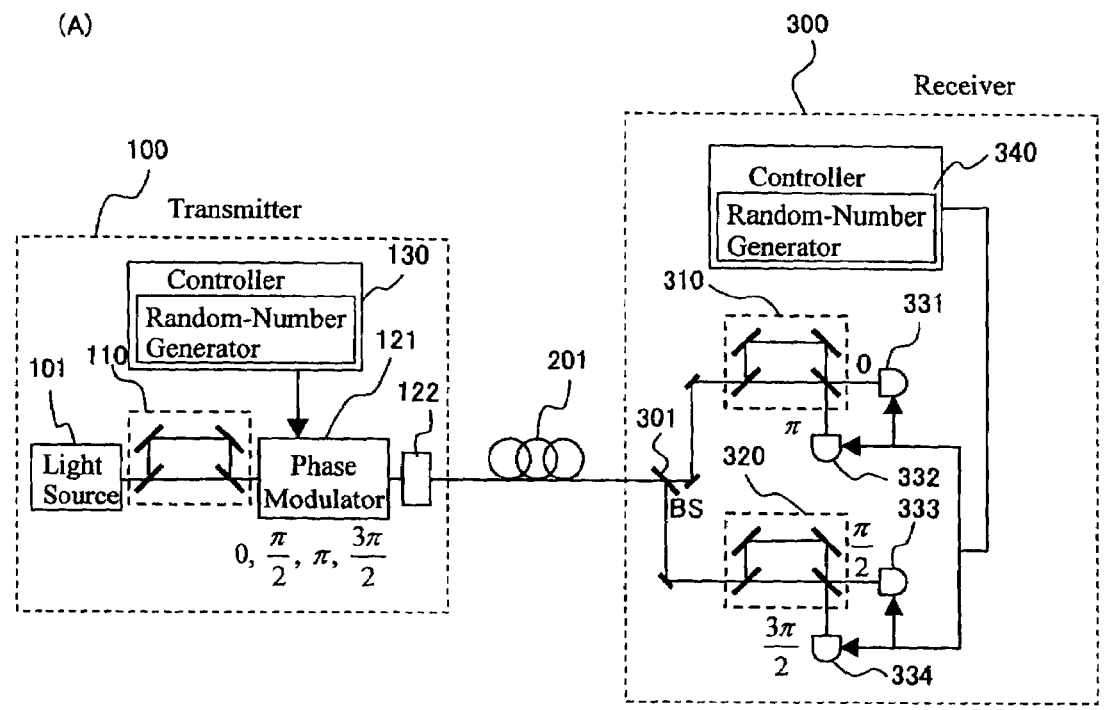
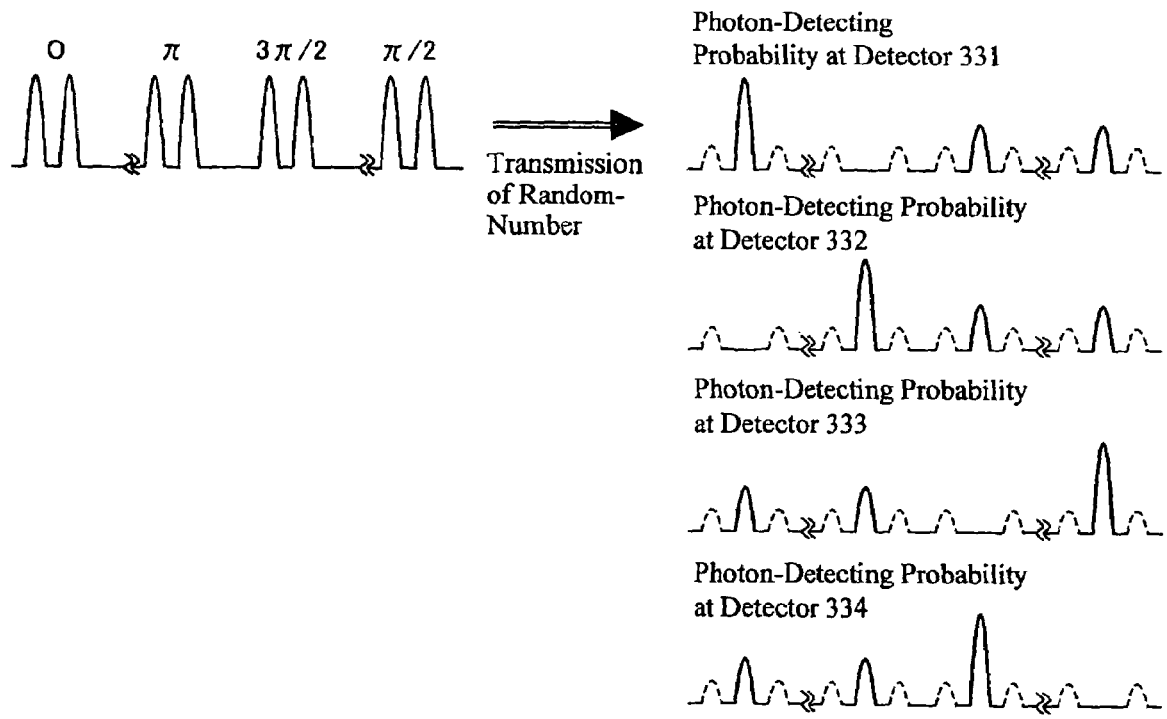

Fig. 2
Phase 0
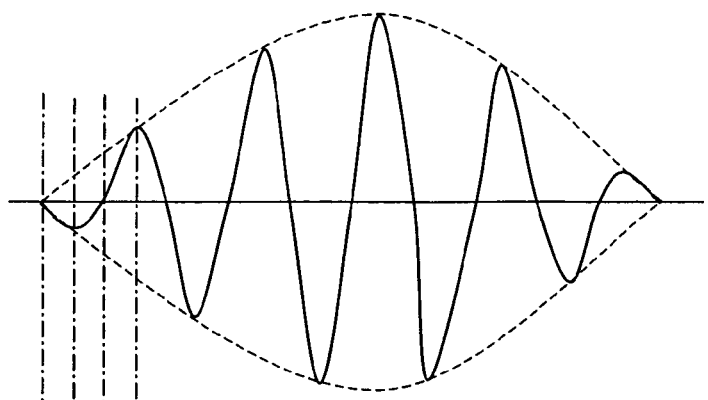
Phase π/2
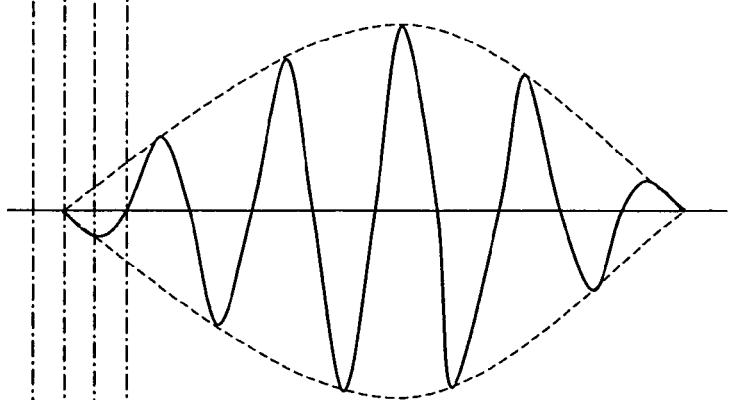
Phase π
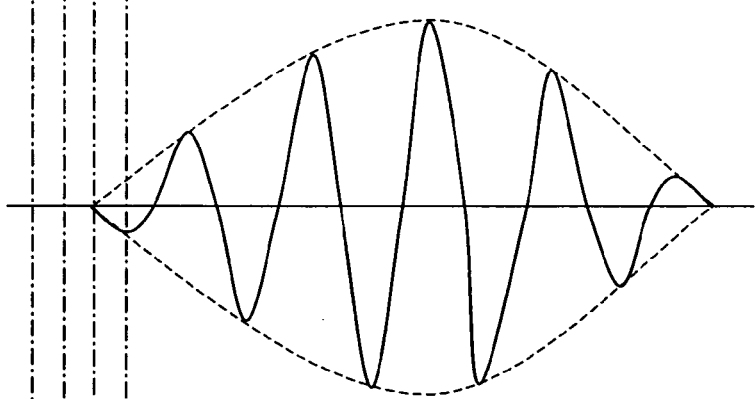
Phase 3π/2
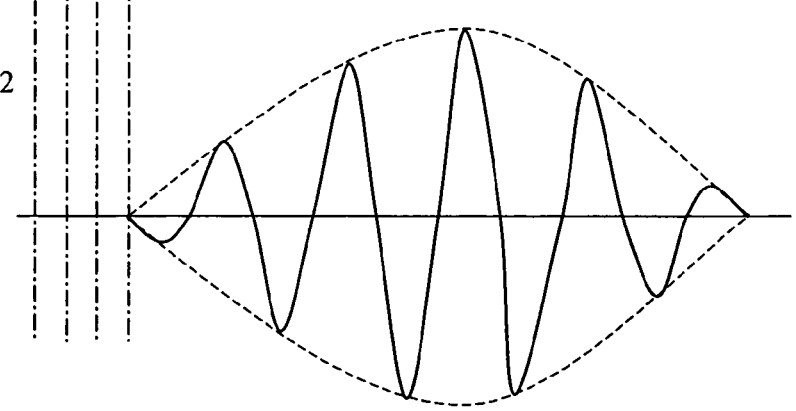

Fig. 4
(A)
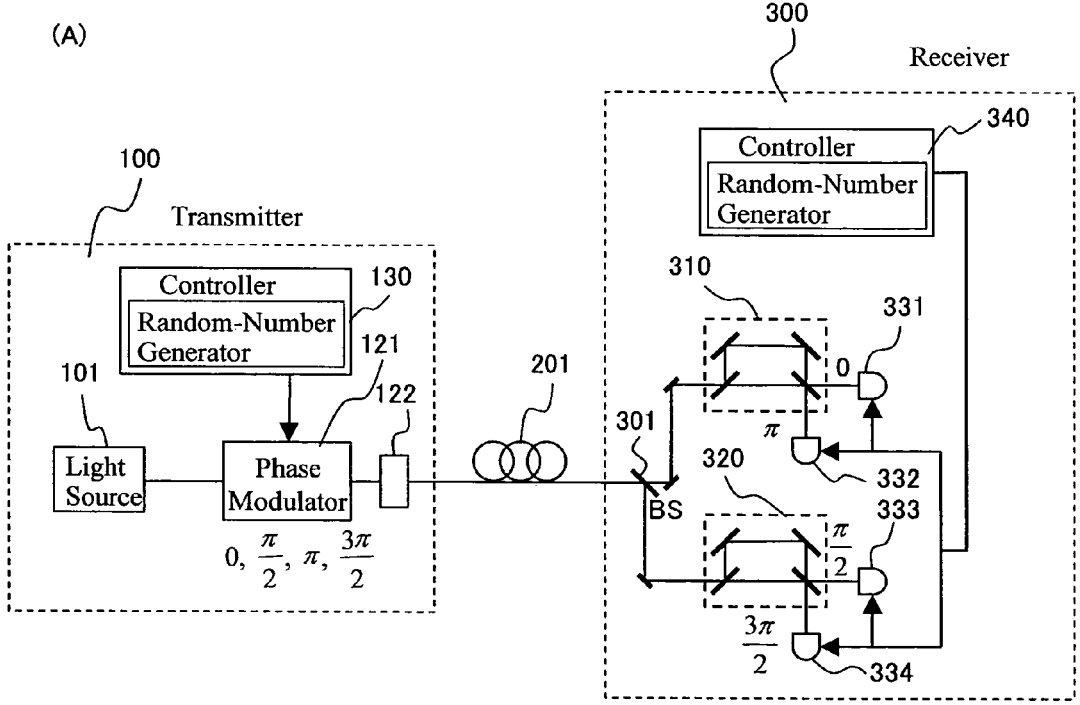
(B)
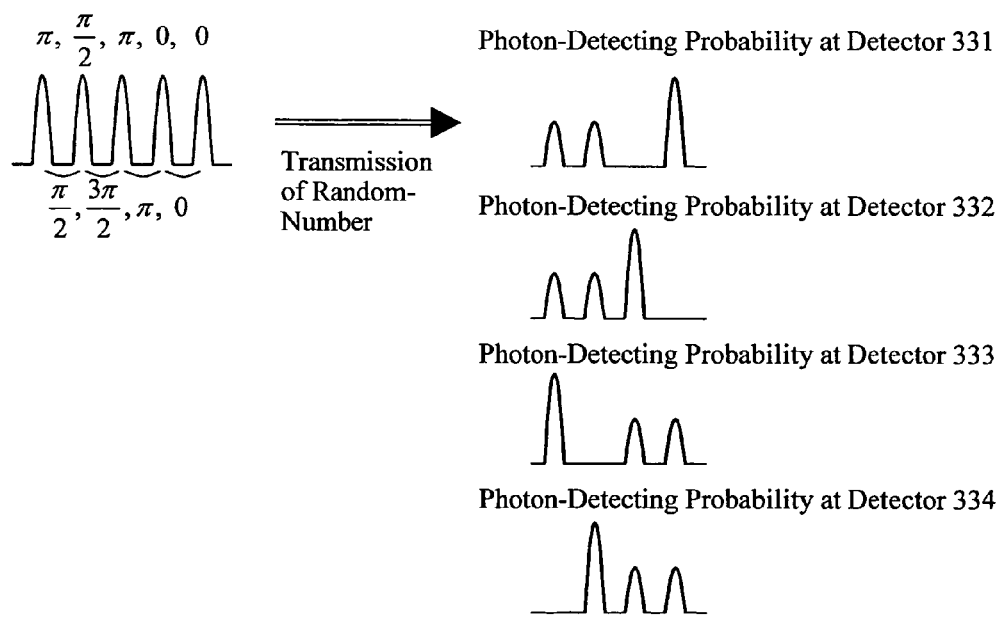

Memory 170

| Pulse Position | Two-bit Random-Number to encode each Pulse |
|---|---|
| 0 | 00 |
| 1 | 00 |
| 2 | 10 |
| 3 | 01 |
| 4 | 10 |
| ... | ... |
| 100 | 11 |
| 101 | 00 |
| 102 | 11 |
| 103 | 10 |
| ... | ... |
| 204 | 11 |
| 205 | 11 |
| 206 | 01 |
| ... | ... |
| 303 | 01 |
| 304 | 11 |
| ... | ... |
| 407 | 00 |
| 408 | 11 |

| Slot Position | Difference of the successive two-bit Random-Number described on the left-hand side |
|---|---|
| 0 | 00 |
| 1 | 10 |
| 2 | 11 |
| 3 | 01 |
| ... | ... |
| 100 | 01 |
| 101 | 11 |
| 102 | 11 |
| ... | ... |
| 204 | 00 |
| 205 | 10 |
| ... | ... |
| 303 | 10 |
| ... | ... |
| 407 | 11 |

⇒

| Signal-Transmitting basis | Transmitted Random-Number |
|---|---|
| 0 | 0 |
| 0 | 1 |
| 1 | 1 |
| 1 | 0 |
| ... | ... |
| 1 | 0 |
| 1 | 1 |
| 1 | 1 |
| ... | ... |
| 0 | 0 |
| 0 | 1 |
| ... | ... |
| 0 | 1 |
| ... | ... |
| 1 | 1 |

Here, signal-transmitting bases 0 and 1 indicate (0, π) and (π/2, 3 π/2) bases, respectively.

(B)

Data Board 3473

| Slot Position | Results of Photon Detection ||||
|---|---|---|---|---|
| | 3481 | 3482 | 3483 | 3484 |
| 0 | 1 | 0 | 0 | 0 |
| 101 | 0 | 0 | 0 | 1 |
| 205 | 0 | 0 | 1 | 0 |
| 303 | 0 | 1 | 0 | 0 |
| 407 | 0 | 0 | 0 | 1 |

⇒

| Signal-Receiving Basis | Received Random-Number | Success and Failure of Random-Number Transmission |
|---|---|---|
| 0 | 0 | ○ |
| 1 | 1 | ○ |
| 1 | 0 | × |
| 0 | 1 | ○ |
| 1 | 1 | ○ |

Here, signal-receiving bases 0 and 1 indicate (0, π) and (π/2, 3 π/2) bases, respectively.

Here, selected bases 0 and 1 indicate (0, π) and (π/2, 3 π/2) bases, respectively.

CRYPTOGRAPHIC-KEY-GENERATION COMMUNICATION SYSTEM

CLAIM OF PRIORITY

The present application claims priority from Japanese application JP 2005-170663 filed on Jun. 10, 2005, the content of which is hereby incorporated by reference into this application.

FIELD OF THE INVENTION

The present invention relates to a quantum-cryptography communication using a quantum-mechanical technique for a key distribution in a cipher communication.

BACKGROUND OF THE INVENTION

The security of information has been inevitably highly demanded in a network society. In communication technologies, various cryptographies have been developed against the threat of eavesdropping from ancient times. In recent years, there has been known that the cipher communication with very high security can be conducted by using the quantum-mechanical technique for the key distribution in the cipher communication. At present, the quantum cryptography is actively researched.

A system that has been currently most advanced in the research of the quantum key distribution and can be realized at the earliest time is a system that transmits a light that is made as weak as the number of photons can be counted one by one. The number of photons within one signal pulse is set to one or less on an average. Eavesdropping can be found out by this setting. Signal superposition is made by polarization modulation or phase modulation. The polarization modulation may be effective to a free space whereas the phase modulation may be effective to transmission using an optical fiber as a medium.

In order to make the eavesdropping difficult in the quantum key distribution, two kinds of modulated signal bases are prepared, for example, in protocol that is called "BB84", and those bases are then selected at random according to the respective signals (see Non-patent Document 6, "N.Gisin, G. Ribordy, W. Tittel, and H. Zbinden, Reviews of Modern Physics 74, 145 to 195 (2002)"). In the polarization modulation, there are used two kinds of bases one of which allocates two linear polarizations to signals of "0" and "1", and the other of which allocates two circular polarizations to signals of "0" and "1". In the case of the phase modulation, there are used two kinds of bases one of which allocates phases 0 and $\pi$ to signals of "0" and "1", and the other of which allocates phases $\pi/2$ and $3\pi/2$ to signals of "0" and "1".

A reference light is required to detect the phase at a receiving side, and the reference light is transmitted to the receiving side together with a signal light. Then, the signal light and the reference light interfere with each other within a receiver to detect the phase. Because two kinds of bases are used in transmission of the signal, a function for selecting any one of the bases is required at the receiving side. One method for achieving the function is that the phase of the reference light is modulated to 0 and $\pi/2$ within the receiver.

A general single mode optical fiber is manufactured circularly symmetrically, but has a slight birefringence because of nonuniformity or bending. Therefore, even if, for example, a light of linear polarization is transmitted from a transmitting side, the transmitted light becomes generally an elliptic polarization. A normal phase modulator using the electrooptic effect has a polarization dependency because of an intensive birefringence of the electrooptic crystal. When the transmitted light becomes elliptic polarization and is modulated in phase, not only pure phase modulation but also polarization modulation is induced at the same time. In order to solve the above problem, a plug & play system has been devised (see Non-patent Document 1, "A. Muller, t. Herzog, B. Huttner, W. Tittel, H. Zbinden, and N. Gisin, Applied Physics Letters. 70, 793 to 795 (1997)"; and Non-patent Document 2, "H. Zbinden, H. Bechmann-Paquinucci, N. Gisin, and G. Ribordy, Appllied Physics B 67, 743 to 748 (1998)").

The above system is designed in such a manner that a light source is disposed at not a transmitter side but a receiver side, and a light on which signal is superimposed is reciprocated between the receiver and the transmitter. A Faraday mirror is disposed at the transmitter so that when a light emitted from the receiver is reflected at the transmitter and returned to the receiver, the polarizations are always orthogonal to each other in the reciprocating lights. When a light emitted from the receiver is a linear polarization, even if the light is transmitted through any transmission path, the light that has been again returned to the receiver becomes the linear polarization that is orthogonal to the original light. Therefore, the normal phase modulator can be used at the receiver. The light is generally an elliptic polarization at the transmitter even if the light at the receiver is set to be a linear polarization. However, any polarization at the transmitter induces no problem if the phase modulator is disposed in proximity to the Faraday mirror and the lights are modulated in reciprocation since the two polarization components are evenly modulated in reciprocation. However, this method suffers from such a problem that a backward scattered light in the transmission path is mixed into the detector because the light source is disposed at the receiver. This problem causes a transmittable distance to be limited in the quantum key distribution using a faint light.

In order to solve the above problem, there have been recently proposed one-way transmission systems in which a light source is disposed at the transmitter to eliminate the influence of backward scattering (see Non-patent Document 3, "K. Inoue, E. Waks, and Y. Yamamoto, Physical Review Letters 80, 37902 (2002)"; Non-patent Document 4, "K. Inoue, E. Waks, and Y. Yamamoto, Physical Review A 68, 22317 (2003) "; and Non-patent Document 5, "Y. Nambu, T. Hatanaka, and K. Nakamura,. Japanese Journal of Applied Physics 43, L1109 to L1110 (2004)"). In all of those proposed methods, the receiver is made up of only a simple interferometer, and no phase modulator is disposed. However, a method for selecting the bases is required at the receiver.

In Non-patent Document 3, two or more delay lines are prepared at the transmitter, and one signal is made up of three or more pulses so that adjacent pulses are allowed to interfere with each other by means of a delay line that is disposed at the receiver. The three or more pulses composing one signal is transformed to four or more pulses at the receiver. Where a photon is detected in four or more pulses is probabilistic and cannot be known until the photon is detected. In this system, the bases at the receiving side are determined according to the position of the received pulse.

In Non-patent Document 4, a temporal coherence of the light is assumed, and the respective pulses are modulated by differential phase shift keying. The receiver determines 0 and $\pi$ by a simple asymmetric Mach Zehnder interferometer. In this system, the bases are not selected at the receiver, and the detection of eavesdropping is based only on the fact that the number of photons in one pulse is less than one. This fact assures no case in which all of signals are eavesdropped on, and if any portion of the signals is eavesdropped on, the consecutive slots of the portion eavesdropped on are uncertain for an eavesdropper because the signal is differential. If the eavesdropper resends a signal, including uncertain slots, in order to conceal the eavesdropping, the receiver can detect the fact of eavesdropping.

In Non-patent Document 5, two Mach Zehnder interferometers are disposed at the transmitter, and one Mach Zehnder interferometer is disposed at the receiver. With this structure, the bases at the receiver are automatically determined from the slot at which a photon has been detected of three successive pulse slots.

SUMMARY OF THE INVENTION

All of the methods disclosed in Non-patent Documents 3 to 5 require no modulator at the receiver. For that reason, the polarization dependency within the receiver can be suppressed to the degree that the polarization dependency can be ignored. Therefore, it is unnecessary to take it into consideration an influence of a variation in the polarization in the fiber transmission. Further, the reciprocating transmission such as the plug & play system is not required, and there is no influence of backward scattering, to thereby improve the minimum receiving sensitivity.

However, those methods are based on the structure that makes ready to receive all of transmitted signals. In a photon counting using an avalanche photodiode (APD) for a wavelength of 1.55 μm which is a fiber communication band, a photoreceiver can be operated only at a repetition rate of about 1 MHz because of a phenomenon called "after pulse". In order that the methods of Non-patent Documents 3 to 5 are operated by 1 MHz, the length of one arm of the asymmetric Mach Zehnder interferometers in the receiver and the transmitter must be set to 300 m, and therefore the interferometers are greatly influenced by the environments. This makes it difficult to stably operate the asymmetric Mach Zehnder interferometers.

Under the above circumstances, an object of the present invention is to constitute a system that stably operates the asymmetric Mach Zehnder interferometers and can withstand a variation in the polarization during the fiber transmission. Another object of the present invention is to constitute a quantum-mechanical key-distribution system that further improves in security.

A signal is transmitted by a relative phase between a pair of pulses, and an interval between those two pulses is made as small as possible. A clock of signal transmission is made sufficiently larger than an average detection rate of a receiver. The receiver is so designed as not to receive all of the transmitted lights, but a random generator is disposed within the receiver so that the transmitted lights are picked up at random and then detected. The bases for detecting the signal at the receiver are selected by a simple beam splitter.

BRIEF DESCRIPTION OF THE DRAWINGS

FIG. 1A is a block diagram for explaining a principle of specifically implementing the present invention, and FIG. 1B is a schematic diagram showing the distribution of probability that photons exist in pulses in a transmitter and a receiver;

FIG. 2 is a schematic diagram showing an appearance in which an envelope of pulses is delayed by a phase modulator of the transmitter;

FIG. 4A is a block diagram showing another structure for explaining a principle of specifically implementing the present invention, and FIG. 4B is a schematic diagram showing the distribution of probability that photons exist within pulses in the transmitter and the receiver;

FIG. 9A is a diagram showing the outline of an example of the stored contents in a memory 170 and transmitting data obtained from the stored contents, and FIG. 9B is a diagram showing an example of data saved in a data board 3473 and received data obtained from the saved data;

DESCRIPTION OF THE PREFERRED EMBODIMENT

Figure 3:
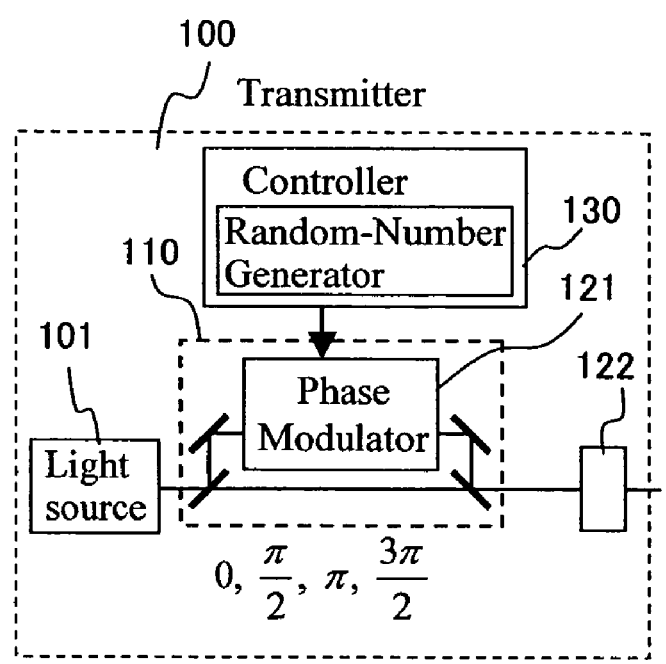
FIG. 3 is a block diagram for explaining another example of the transmitter for specifically implementing the present invention, in which a position of the phase modulator 121 is changed, compared with that in FIG. 1A.

First, a description will be given of transmission and reception of pulses between a transmitter and a receiver for explaining a principle of implementing the present invention.

FIG. 1A is a block diagram for explaining a principle of specifically implementing the present invention, and FIG. 1B is a schematic diagram showing the distribution of probability that photons exist in pulses in a transmitter and a receiver. FIG. 2 is a schematic diagram showing an appearance in which an envelope of pulses is shifted by a phase modulator in the transmitter.

In FIG. 1A, a pulsed output light from a light source 101 is divided into two consecutive pulses by an asymmetric Mach Zehnder interferometer 110 to provide a pair of pulses. That is, pulses that have been split by a beam splitter at an input side of the asymmetric Mach Zehnder interferometer 110 pass through each optical path. Then, a difference between those two optical path-lengths is set to a pulse width or more of the optical pulses outputted from the light source 101. Accordingly, the optical pulses that have passed through each optical path and been coupled by a beam coupler becomes a pair of pulses. The light source 101 may be formed of a laser or a single photon source.

The respective paired pulses are modulated in phase to any one of four levels consisting of 0, π/2, π, 3π/2 by a phase modulator 121 according to a random-number of two bits supplied from a controller 130. That is, when the transmitted phase is 0, the same delay is given both of the paired pulses. When the transmitted phase is π/2, the second pulse of the paired pulses is delayed by π/2 with respect to the first pulse. When the transmitted phase is π, the second pulse of the paired pulses is delayed by π with respect to the first pulse. When the transmitted phase is 3π/2, the second pulse of the paired pulses is delayed by 3π/2 with respect to the first pulse. In this way, the phase difference is transmitted to the receiver 300 from the transmitter 100. FIG. 2 is a schematic diagram showing a situation in which an envelope of pulses is shifted by a delay given by the phase modulator 121.

The left half of FIG. 1B schematically shows paired pulses that are output from the asymmetric Mach Zehnder interferometer 110. A numeric value indicated above the paired pulses is representative of a phase difference between the paired pulses which corresponds to the random-numbers superimposed by the phase modulator 121 according to a random-number of 2 bits supplied from the random-number generator within the controller 130. For example, when the random-numbers of 2 bits with respect to the respective pulses are 00 and 00, the paired pulses with a relative phase of 0 are output. When the random-numbers of 2 bits are 11 and 01, the paired pulses with a relative phase of π are output. When the random-numbers of 2 bits are 00 and 11, the paired pulses with a relative phase of 3π/2 are output. When the random-numbers of 2 bits are 10 and 11, the paired pulses with a relative phase of π/2 are output. The total interval between the respective paired pulses is a sum of a constant interval and a phase shift shown in FIG. 2. The phase shift is extremely small as compared with the pulse widths of the respective pulses, which does not influence the interference intensity in the receiver and is not represented in FIG. 1B.

The differential random-numbers become the source of a cryptographic key that is finally shared by the sender and the recipient. A pulse train that has been phase-modulated is attenuated by an optical attenuator 122 so that the number of photons per one pulse is one or less in average, and then transmitted to a transmission path 201. When the light source 101 is a single photon source, it is possible to omit the optical attenuator 122 because the condition that the number of photons is one or less in average is satisfied.

The transmission path 201 is generally an optical fiber.

The photon train that has reached the receiver 300 is divided into two ports by a beam splitter 301, and then guided to asymmetric Mach Zehnder interferometers 310 and 320. Each of the respective optical path-length differences of the asymmetric Mach Zehnder interferometers 310 and 320 is so set as to substantially coincide with the optical path-length difference of the asymmetric Mach Zehnder interferometer 110. With this structure, the paired pulses that have been transmitted from the transmitter interfere with each other.

The optical path-length difference of the asymmetric Mach Zehnder 310 is set to a phase difference 0 (that is, the optical path-length difference is an integral multiple of the wavelength), and whether the phase difference between the paired pulses is 0 or π is judged. When the phase difference is 0, the photons are detected by a photodetector 331. When the phase difference is π, the photons are detected by a photodetector 332. The optical path-length difference of the asymmetric Mach Zehnder 320 is set to a phase difference π/2 (that is, the optical path-length difference is an integral multiple of the wavelength +¼ wavelength), and whether the phase difference between the paired pulses is π/2 or 3π/2 is judged. When the phase difference is π/2, the photons are detected by a photodetector 333. When the phase difference is 3π/2, the photons are detected by a photodetector 334. The photons can be detected by those two asymmetric Mach Zehnder interferometers 310 and 320 for all the case of phase differences.

The beam splitter 301 divides the input photon train into two ports with the probability of 50:50, and then guides the divided photon trains to the asymmetric Mach Zehnder interferometers 310 and 320. Because the input pulse with the number of photons being one or less in average is transmitted through the transmission path 201, the input pulse is probabilistically guided to only one of the asymmetric Mach Zehnder interferometer 310 or 320. The right half of FIG. 1B schematically expresses, by the intensity of pulses, the probability that the input pulses are detected after interfering with each other in the asymmetric Mach Zehnder interferometers 310 and 320. Paired pulses that have interfered with each other become a three-pulse state, and the phase relationship of the paired pulses reflects only the center pulse. Only the center pulse is detected by the receiver. When the paired pulses with the phase difference of 0 are input to the asymmetric Mach Zehnder interferometer 310, the paired pulses are detected by only the photodetector 331, and not detected by the photodetector 332. When the paired pulses with the phase difference 0 are input to the asymmetric Mach Zehnder interferometer 320, the paired pulses are detected by the photodetectors 333 and 334 with equal probability. When the paired pulses with the phase difference π are input to the asymmetric Mach Zehnder interferometer 310, the paired pulses are detected by only the photodetector 332. Contrary to the cases where the phase difference is 0 and π, when the paired pulses with the phase difference 3π/2 are input to the asymmetric Mach Zehnder interferometer 310, the paired pulses are detected by the photodetectors 331 and 332 with equal probability. When the paired pulses with the phase difference of 3π/2 are input to the asymmetric Mach Zehnder interferometer 320, the paired pulses are detected by the photodetector 334, and not detected by the photodetector 333. When the paired pulses with the phase difference of π/2 are input to the asymmetric Mach Zehnder interferometer 320, the paired pulses are detected by the photodetector 333.

In the quantum-mechanical key distribution system (for example, a system called "BB84"), the transmission and reception of the random-number data of one bit is conducted by selecting two kinds of bases at random (2 bits in combination) (see Non-patent Document 6). The present invention uses, as two kinds of binary bases, two kinds of bases consisting of a basis having phase differences of 0 and π, and a basis having phase differences of π/2 and 3π/2. A case in which a photon is detected by the photodetector 331 or 332 corresponds to the selection of a basis of (0, π). A case in which a photon is detected by the photodetector 333 or 334 corresponds to the selection of a basis of (π/2, 3π/2). The basis at the receiver side must be selected at random. In this embodiment, the selection is conducted by the beam splitter, and passive and perfectly at random, based on the natural laws. Also, the method of the present invention implements the quantum-mechanical key distribution system completely with the phase modulation.

As is described with reference to the left side of FIG. 1B, the random number that is transmitted in the present invention is 2 bits. The lower bit of those 2 bits corresponds to the selection of the basis of (0, π) or (π/2, 3π/2), and the higher bit corresponds to the random number that becomes the source data of the cryptographic key (refer to FIG. 9).

In the general communication, all of the signals that have been transmitted from the transmitter can be detected at the receiver. On the other hand, the present invention transmits a random-number signal by a clock higher than the average detection rate at the receiver. For example, assuming that the average detection rate is 1 MHz, the transmission rate is 100 MHz, 1 GHz or 10 GHz. When the transmission rate is 100 MHz, the receiver makes ready to detect the random-number data at a rate of 1/100 of the transmission rate in average. Which of 100 random data should be selected is determined by a controller 340 with a random-number generator which is located within the receiver.

In the single-photon detection, it is general to employ a photon counting method using an avalanche photodiode (APD). However, an APD is generally low in the sensitivity for communication wavelength of 1.55 μm. To increase the sensitivity, a voltage pulse is applied to the APD over a breakdown voltage in a time gate where a photon might come into (this use of APD is called "Geiger mode"). However, when the applied voltage to the APD is over the breakdown voltage, a phenomenon that is called "after-pulse" is induced to deteriorate the performance of the detector. The deterioration is prevented by providing a sufficiently large interval between the gate pulses. The typical interval is about 1 μs, and a typical average detection rate is 1 MHz. In the present technical level, an eavesdropper can detect a single photon by only about 1 MHz. Accordingly, when a random-number signal is transmitted at, for example, 100 MHz, and a signal to be detected is selected at random, the probability that the eavesdropper and a regular recipient detect the same time slot is lessened, thereby making it possible to reduce the eavesdropping probability.

The advantages of the present invention on the reception of the random-number signal will be described in more detail. The time gates of the photodetectors 331, 332, 333 and 334 are opened only for the center pulse of the three-pulse states. The method of the present invention which does not require the measurement of the first and third pulses of the three-pulse states is excellent from the viewpoint of stabilizing the asymmetric Mach Zehnder interferometers 110, 310 and 320. If it is necessary to measure the first and third pulses, it is necessary to set the respective intervals of three output pulses to about 1 μs. In this case, the optical path-length difference of the asymmetric Mach Zehnder interferometer must be set to about 300 m. It is difficult to stabilize such a length with a precision of the wavelength or shorter.

On the other hand, in the present invention, it is only necessary that only the center pulse enters within the time width of the gate pulse that is applied to the photodetectors 331, 332, 333 and 334. This means that the optical path-length difference of the asymmetric Mach Zehnder interferometer can be set to about 300 mm if the gate pulse that is supplied from the controller 340 is 1 ns. This length can be sufficiently stabilized by controlling the temperature of the asymmetric Mach Zehnder interferometer, or controlling the optical path-length with the feedback system using a piezoelectric device.

FIG. 3 is a block diagram for explaining another example of the transmitter for specifically implementing the present invention in which a position at which the phase modulator 121 shown in FIG. 1A is changed.

In FIG. 1, the phase modulator 121 is disposed in the rear of the asymmetric Mach Zehnder interferometer 110. In FIG. 3, the phase modulator 121 is disposed in one arm of the asymmetric Mach Zehnder interferometer 110. At the position of the phase modulator 121 shown in FIG. 1, it is necessary to modulate each pulse of a pair that has been produced by the asymmetric Mach Zehnder interferometer 110, respectively. However, in the arrangement of FIG. 3, it is necessary to modulate only a pulse in one arm. In the arrangement of FIG. 1, the phase modulator needs to operate at a rate twice as high as the transmission clock. However, in the arrangement of FIG. 3, the phase modulator may operate at the same rate as the transmission clock. Since a loss occurs in the phase modulator 121, the branch ratio of the beam splitter at the input side of the asymmetric Mach Zehnder interferometer 110 is not 50:50, but is set to the branch ratio taking the loss of the phase modulator 121 into consideration in the arrangement of FIG. 3. Then, the pulse that comes directly from the beam splitter and the pulse that comes through the phase modulator 121 are set to be identical with each other in intensity when those pulses are coupled with each other by the beam coupler.

FIG. 4A is a block diagram showing still another structure for explaining a principle of specifically implementing the present invention. FIG. 4B is a diagram schematically showing the distribution of probability that the photons exist in the pulse at the transmitter and the receiver.

FIG. 4A is a structure that omits the asymmetric Mach Zehnder interferometer 110 within the transmitter 100 in which a laser source is used for the light source 101, and the coherence time τ of the laser is made sufficiently larger than the inverse of the transmission clock, 1/fr. The same structural elements as those shown in FIG. 1A are indicated by identical reference numbers. In the phase modulator 121 of this structure, the respective pulses that are generated by the light source 101 are phase-modulated to four levels of 0, π/2, π, and 3π/2 according to the random number of two bits which are output from the random number generator within the controller 130. FIG. 4B shows an example in which modulation phases for each pulse are 0, 0, π, π/2, and π, corresponding to the numbers of two bits 00, 00, 10, 01 and 10, respectively (in FIG. 4B, the order of those numeric numbers is reversely described for the convenience of the transmission direction). The phase differences between those successive pulses become 0, π, 3π/2, and π/2, corresponding to the numbers of two bits 00, 10, 11, and 01, respectively. In other words, the transmission bases are 0, 0, 1, and 1, and the transmitted random numbers are 0, 1, 1, and 0 (refer to FIG. 9).

When the laser beam is divided into two beams and again coupled with each other, those beams interfere with each other within the coherence time. The optical path-length differences between two arms of the asymmetric Mach Zehnder interferometers 310 and 320 within the receiver 300 are set to c/fr (c is the velocity of light in vacuum), and the pulse that has been transmitted from the transmitter 100 is divided into two ports by the beam splitter 301 and then introduced into the asymmetric Mach Zehnder interferometers 310 and 320 within the receiver 300. Then, the pulse train emitted from the light source 101 at the repetition rate fr interfere with each other between the adjacent pulses due to the asymmetric Mach Zehnder interferometers 310 and 320. That is, the adjacent pulses interfere with each other as with the paired pulses described with reference to FIG. 1.

The right half of FIG. 4B shows, by the pulse intensity, the probability that the respective input pulses are detected at the detectors 331, 332, 333 and 334 after interfering with each other with the asymmetric Mach Zehnder interferometers 310 and 320. In the example of FIG. 4B, since the phase difference between the first pulse and the second pulse is 0, when those pulses are input to the asymmetric Mach Zehnder interferometer 310, the photodetector 331 detects a photon and the transmitted random number is judged to be 0. When those pulses are input to the asymmetric Mach Zehnder interferometer 320, the transmitted random number cannot be judged since the probabilities that the pulses are detected by the photodetectors 333 and 334 are equal to each other. Since the phase difference between the second pulse and the third pulse is $\pi$, when those pulses are input to the asymmetric Mach Zehnder interferometer 310, the photodetector 332 detects a photon and the transmitted random number is judged to be 1. When the pulses are input to the asymmetric Mach Zehnder interferometer 320, the transmitted random number cannot be judged. Since the phase difference between the third pulse and the fourth pulse is $3\pi/2$, if those pulses are input to the asymmetric Mach Zehnder interferometer 320, then a photon is detected at the photodetector 334, and the random number 1 is judged. When the pulses are input to the asymmetric Mach Zehnder interferometer 310, the random number cannot be judged. Since the phase difference between the fourth pulse and the fifth pulse is $\pi/2$, if those pulses are input to the asymmetric Mach Zehnder interferometer 320, then a photon is detected at the photodetector 333, and the random number 0 is judged. When the pulses are input to the asymmetric Mach Zehnder interferometer 310, the random number cannot be judged.

It is unnecessary to divide one pulse into two pulses within the transmitter as in the example of FIG. 1A, and the structure is simplified. Also, in the example of FIG. 4, since the intervals in the pulse train from the light source 101 coincide with the optical path-length differences between two arms of the asymmetric Mach Zehnder interferometers 310 and 320, the first and third pulses as in FIG. 1B cannot be produced, and only the center pulse is produced. The random-number data that are transmitted at the repetition rate of fr is detected at random in the receiver 300 as in the case of FIG. 1A.

First Embodiment

Figure 5:
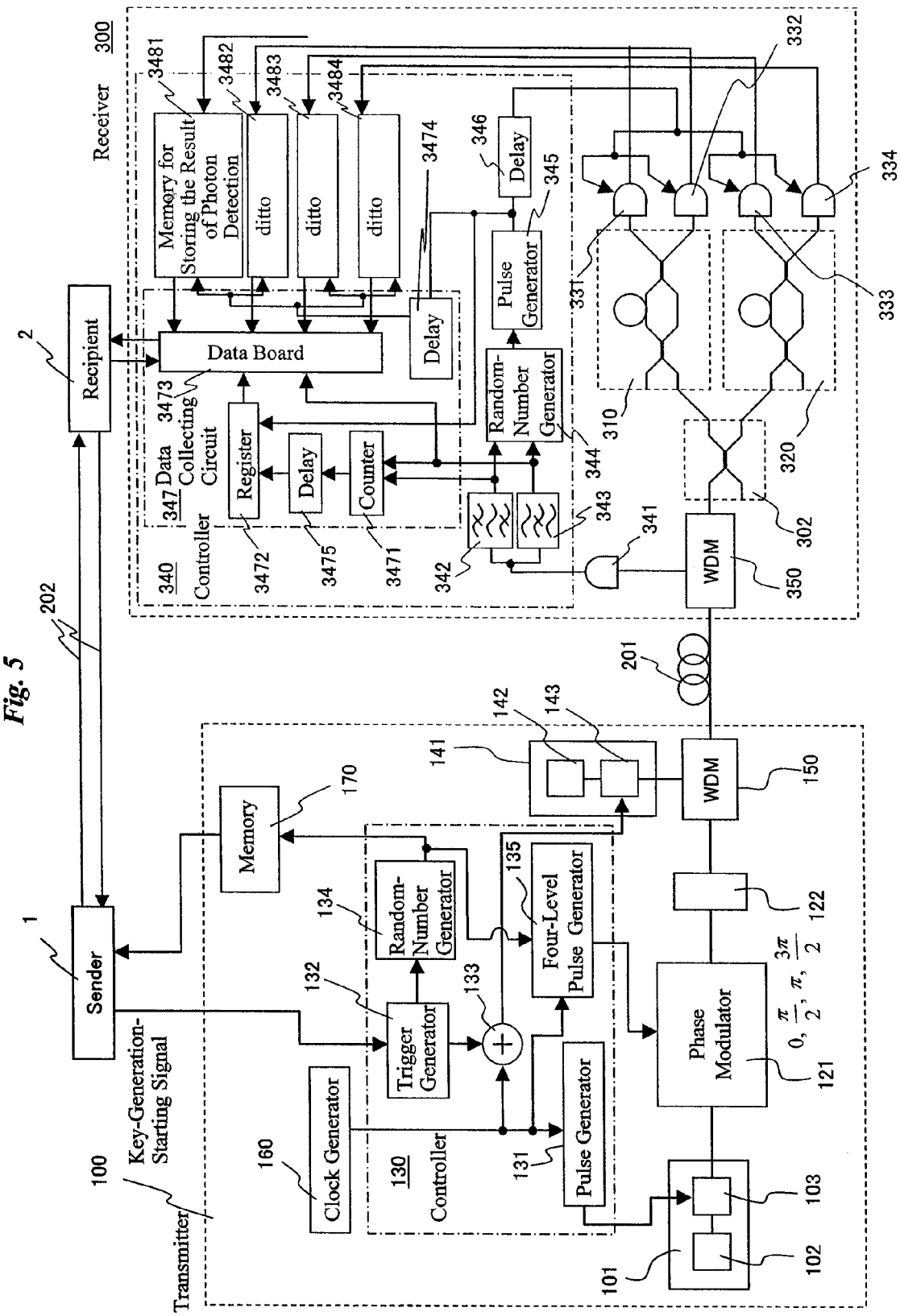
FIG. 5 is a block diagram showing the structure of a communication system according to an embodiment of the present invention.

FIG. 5 is a block diagram showing a communication system according to an embodiment of the present invention. A sender 1 and a recipient 2 communicate with each other through a general line 202. Since the general line 202 is normally easy to eavesdrop, cipher communication is conducted in general. In this situation, it is necessary to share the cryptographic key that can be known by only the sender 1 and the recipient 2. The transmitter 100 generates and transmits the random-number data that is a source for generating the cryptographic key, and the receiver 300 receives the random-number data through the transmission path 201. The description made with reference to FIGS. 1A to 4B is given of the structure and operational principle for transmitting and receiving the random-number data. In this example, the sender 1 and the recipient 2 do not always represent persons, but have broad meaning including a necessary device in the communication, such as computers held by the sender 1 and the recipient 2.

The transmission and reception from the transmitter 100 to the receiver 200 through the transmission path 201 are performed in synchronizing with clocks that are generated by the clock generator 160 disposed in the transmitter 100. The clocks are sine waves that are stabilized at a high frequency, for example, 100 MHz, 1 GHz or 10 GHz. The clock is input to the controller 130 and first is input to the pulse generator 131. The pulse generator 131, the output of which is used to get optical pulses in the light source 101, generates a pulse having a time width of, for example, 100 ps synchronizing with the clock. The light source 101 is made up of a laser source 102 and an intensity modulator 103. An output pulse from the pulse generator 131 is input to the intensity modulator 103, and a pulse with a time width of, for example, 100 ps is output in synchronizing with the clock according to the signal of the pulse generator 131. In the structure of FIG. 5, no asymmetric Mach Zehnder interferometer is located within the transmitter 100, and the interference of the signal lights within the receiver 300 is performed between the optical pulses that are directly generated by the light source 101, similar to the example described with reference to FIG. 4. The coherence of the output light from the light source 101 is important from the above viewpoint. There is a method of inputting the output pulse from the pulse generator 131 directly to a continuous-wave laser 102 and generating the pulse light directly from the laser 102. However, coherence is an important in the case of FIG. 5 and the generation of the pulse light by using the continuous-wave laser 102 and the modulator 103 is advantageous because the deterioration of the coherence is prevented. A distributed feedback (DFB) laser used in optical communication can be employed for the continuous-wave laser 102.

Another light source 141 is located within the transmitter 100. A main role of the light source 141 is to transmit the clock to the receiver 300, and the intensity modulation is conducted with substantially the original shape of the output clock from the clock generator 160. Likewise, the constitution of the light source 141 is preferably made up of a continuous-wave laser 142 and an intensity modulator 143. It is possible to directly modulate the laser 142. However, when the light source 141 is used for the reference light monitoring the asymmetric Mach Zehnder interferometers 310 and 320 within the receiver 300 as shown in a fourth embodiment, it is advantageous from the viewpoint of the coherence that the output of a continuous-wave laser 142 is modulated with a modulator 143. Since it is necessary to distinguish two light sources 101 and 141 from each other at the receiving side, different wavelengths from each other are employed. For example, a wavelength of 1.55 μm is used for the light source 101, and a wavelength of 1.3 μm is used for the light source 141. Alternatively, slightly different wavelengths of a 1.55 μm band can be employed for the light sources 101 and 141 as in the dense wavelength-division multiplexing.

A cryptographic-key generation is started by the sender 1 who sends an instruction signal to the transmitter 100. A trigger signal is generated from a trigger generator 132 within the controller 130 according to the instruction signal, and then transmitted to a sum circuit 133 and a random-number generator 134. The sum circuit 133 adds the clock and trigger signals. The output of the light source 141 is modulated according to the added signals and is then transmitted to the receiver 300. In order to distinguish the clock and the trigger signals from each other, the trigger signal is so designed as not to include the frequency of the clock. The random-number generator 134 that receives the trigger signal starts to transfer the random-number data of two bits to a four-level pulse generator 135, and the four-level pulse generator 135 transmits the four-level random number to the phase modulator 121 in synchronizing with the clock. The output pulse light from the light source 101 is phase-modulated to 0, $\pi/2$, $\pi$, and $3\pi/2$ by the phase modulator 121. Then, the pulse light is attenuated to 1 or less in the average number of photons per one pulse by the attenuator 122. After the pulse light is coupled with the clock light by a WDM coupler 150, the pulse light is sent out to the transmission path 201 as the signal light. Reference numeral 170 denotes a memory in which the output random number from the random-number generator 134 is saved together with pulse position or slot position.

FIG. 9A is a diagram showing the outline of an example of the stored contents in the memory 170. The memory 170 saves the random numbers of all the slots in time series since the transmitter does not know which slots are received by the receiver. The stored contents in the memory 170 are transmitted to the sender 1 according to a request of the sender 1, to thereby obtain source data for a cryptographic-key generation. The memory 170 may be disposed in the interior of the sender 1 alternatively. The transmitted random-number data in time series are a difference of the random numbers of two bits between the successive pulse positions. The lower bits of differentiated two bits represent the transmission basis of (0, π) or (π/2, 3π/2), and the higher bits represent the transmitted random numbers per se.

The use of an optical fiber for the transmission path 201 is advantageous from the viewpoint of long-haul transmission and the security. Various single mode fibers for communication bands can be used for the transmission path 201. The single mode fiber with a normal distribution is typical, but the use of a low-loss fiber with a pure-silica core is advantageous from the viewpoint of the longer haul. When the bit rate is highly set, a dispersion-shifted fiber is advantageous because it suppresses pulse broadening.

Figure 6:
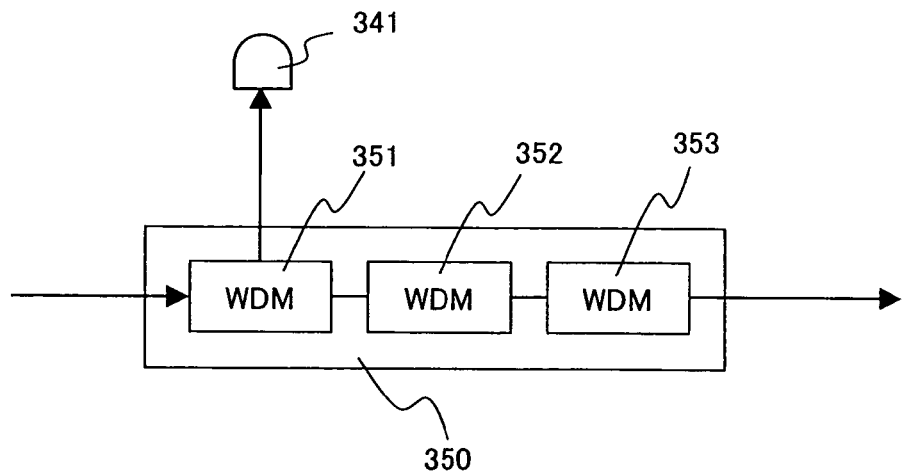
FIG. 6 is a block diagram showing an example in which WDM couplers 351-353 are arranged in series.

The signal light that has reached the receiver 300 is split from the clock light by a WDM coupler 350. Since the clock light has a high intensity whereas the signal light has a faint intensity, the clock light leaks into the signal light side if only one WDM coupler is located. In order to prevent this leak, several WDM couplers may be aligned in series. FIG. 6 is a block diagram showing an example in which WDM couplers 351 to 353 are aligned in series. A clock light that is split by the first WDM coupler 351 is converted into an electric signal by a photodetector 341 and then guided to the controller 340. The faint signal light that has been split from the clock light through the three WDM couplers 351, 352 and 353 passes through a coupler 302 having branching ratio of 50:50, and then enters the asymmetric Mach Zehnder interferometers 310 and 320. After the successive pulses interfere with each other, those pulses reach the photo-detectors 331, 332, 333 and 334, and are detected. In FIGS. 1A and 4A, the asymmetric Mach Zehnder interferometer within the receiver 300 are constituted by a free space system using beam splitters and mirrors. On the other hand, in FIG. 5, the asymmetric Mach Zehnder interferometers are constituted by a waveguide system using couplers. Non-input ports of the coupler 302 and the couplers within the asymmetric Mach Zehnder interferometers 310 and 320 are terminated so that a stray light is not mixed into the non-input ports.

The asymmetric Mach Zehnder interferometers 310 and 320 need to be accurately adjusted in such a manner that the optical path-length difference between two arms is set so that the adjacent pulses interfere with each other, in addition, the accuracy must be in a wavelength level so as to determines the phase differences 0 and π or the phase differences π/2 and 3π/2. Also, the asymmetric Mach Zehnder interferometer must be independent on the polarization. Various methods that realize the above requirements are proposed.

Figure 7:
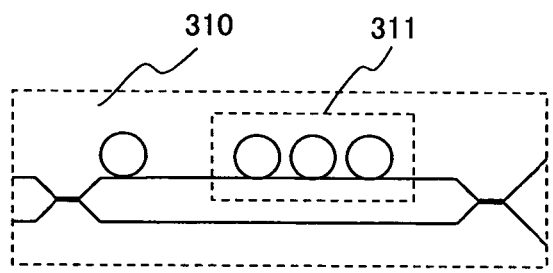
FIG. 7 is a diagram showing an example in which an optical path portion of an asymmetric Mach Zehnder interferometer 310 is formed of only single mode fibers, where a single-mode-fiber-based polarization controller compensats for the residual birefringence in the asymmetric Mach Zehnder interferometer.

FIG. 7 is a diagram showing an example in which an optical path portion of the asymmetric Mach Zehnder interferometer 310 is made up of only single mode fibers in order to make the asymmetric Mach Zehnder interferometer independent on the polarization. In order to realize an accurate optical path length difference, the lengths of two optical fibers are accurately adjusted. The entire asymmetric Mach Zehnder interferometer 310 is precisely controlled in temperature by means of a Peltier cooler or the like to maintain the phase difference in the wavelength level. The birefringence that slightly exists in the single mode fiber is compensated by a fiber-type polarization controller 311 disposed in one arm.

Figure 8:
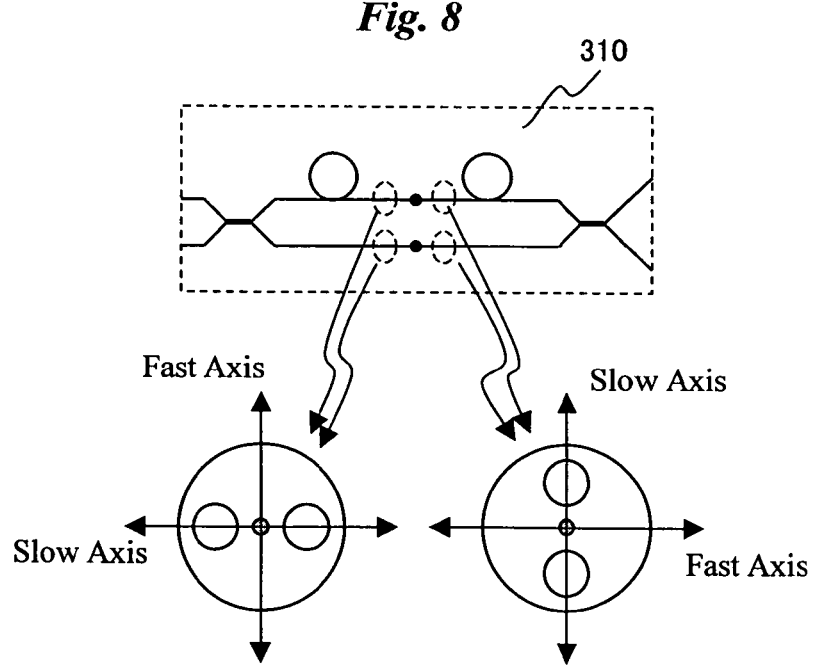
FIG. 8 is a diagram showing an example in which an optical path portion of the asymmetric Mach Zehnder interferometer 310 is formed of polarization maintaining fibers in order to make the asymmetric Mach Zehnder interferometer independent on polarization.

FIG. 8 is a diagram showing an example in which an optical path portion of the asymmetric Mach Zehnder interferometer 310 is made up of polarization-maintaining fibers in order to make the asymmetric Mach Zehnder interferometer independent on the polarization. All of the optical-path portions of the asymmetric Mach Zehnder interferometer 310 including the couplers are made up of polarization-maintaining fibers. The two polarization-maintaining fibers are connected to each other such that the optical axes of one polarization-maintaining fiber respectively are orthogonal to the optical axes of another polarization-maintaining fiber at positions indicated by black points which are just the middle points in both arms. The lower portion of FIG. 8 shows the cross sections of the optical fibers in the vicinity of the connected positions. The black center portions of the cross-sectional views indicate cores. When the lengths of the polarization-maintaining fibers are set to be accurately equal to each other, the polarization states coincide with each other between the inlet and the outlet of the interferometer, to thereby realize the polarization independency of the interferometers. In FIG. 8, the asymmetric Mach Zehnder interferometer is entirely made of the polarization-maintaining fibers. Alternatively, the case where a polarization-maintaining fiber is employed to only a portion corresponding to a path-length difference between the two arms gives the same polarization independent interferometer, too. In FIG. 8, the phase difference in the interferometers is controlled in the wavelength level with a temperature controller and a Peltier cooler or the like as in FIG. 7. The structure of FIG. 8 may be constituted by means of a planer lightwave circuit (PLC).

FIG. 8 shows a method in which the optical axes of two polarization-maintaining fibers are orthogonally connected with each other in the center of each arm. Also, there is another method without an orthogonal connection of polarization-maintaining fibers, controlling not only the phase difference in the interferometers but also the polarization state by the temperature control at the same time, based on the fact that the birefringence of the PLC is large. A problem of the structures shown in FIGS. 7 and 8 is that a large variation of the optical path-length difference between two arms cannot be obtained by only the temperature control. When the optical path-length difference is intended to be adjusted by the large variation, it is necessary to adjust the optical path length by means of a mechanical stage or a piezoelectric actuator. An example of this method will be described with reference to a second embodiment.

Returning to FIG. 5 again, the internal structure of the controller 340 in the receiver 300 will be described below. The clock light that has been split by the WDM coupler 350 is converted into an electric signal by means of the photodetector 341, and then introduced into the controller 340 so as to be used as a clock for detection of the signal light. Since the received clock light is modulated by the sum of the clock and the trigger signal through the sum circuit 133 as described in the operation of the transmitter 100, the received clock signal includes two kinds of information of the transmission clock per se and the trigger signal representative of the transmission start. In order to split those signals from each other, a band pass filter 342 that allows only the clock frequency to pass therethrough, and a filter 343 that extracts only the trigger component are located. Since the trigger signal is formed of frequency components other than the clock frequency, the filter 343 is realized by a notch filter in this embodiment.

The random-number generator 344 starts the regular operation by the trigger signal. The random-number generator 344 determines what time slot of the random-number data, transmitted from the transmitter 100 synchronizing with the clock, is detected by the photodetectors 331, 332, 333 and 334. The pulse generator 345 generates a voltage pulse corresponding to an output of the random generator 344. The voltage pulse is applied to the photodetectors 331, 332, 333 and 334 through a delay circuit 346 and opens the gates of those photodetectors. The delay circuit 346 cancels the difference on the total transmission time between the clock and the signal. The gate width is typically about 1 ns when an APD for a 1.55 μm band is used as the photodetectors 331, 332, 333 and 334. The pulse generator 345, for example, outputs pulses once per 100 times with respect to the clock for the clock frequency of 100 MHz and the average detection rate of 1 MHz. The gates of the photodetectors are opened at the average detection rate.

The timing at which the gates of the photodetectors 331, 332, 333 and 334 open must be accurately synchronized with the signal pulse that is transmitted from the transmitter 100. Basically, the optical path lengths of the signal light which extend from the transmitter 100 to the photodetectors 331, 332, 333 and 334 are equally set with respect to the four photodetectors. Also, the lengths of electric wires that extend from the controller 340 to the respective photodetectors 331, 332, 333 and 334 are made equal to each other. The optical path-length difference between the clock light and the signal light is adjusted by the length of the optical fiber at a portion after those lights are split, and the delay circuit 346.

The clock that is obtained through the filter 342, the trigger signal that is obtained through the filter 343, and the output of the pulse generator 345 are also sent to a data collecting circuit 347. A counter 3471 disposed in the data collecting circuit 347 is initialized according to the trigger signal which is an output of the filter 343. The counter 3471 counts the clocks that are output from the filter 342. The data collecting circuit 347 is equipped with a data board 3473 for saving, in time series, the data in memory circuits 3481, 3482, 3483 and 3484 which store photon detection results detected by the photodetectors 331, 332, 333 and 334. The data board 3473 is initialized by the same trigger signal that initializes the counter 3471. The memory circuits 3481, 3482, 3483 and 3484 store the photon-detection results of a time slot, where gates are opened according to the outputs supplied from the random-number generator 344. The memory circuits 3481, 3482, 3483, and 3484 storing the photon-detection results transfer the stored data to the data board 3473 according to the timing pulse outputted from the delay circuit 3474. The timing pulse is sent to the memory circuits at a slightly delayed timing, just after the memory circuits have gotten a photon-detection result. After the data transfer, the stored data in the memory circuits 3481, 3482, 3483, and 3484 are cleared.

A register 3472 receives the output of the counter 3471 through the delay circuit 3475, and maintains the temporal count number. When the pulse generator 345 outputs an on-signal, the register 3472 transfers the maintained count number to the data board 3473. The delay circuit 3475 adjusts the timing of the output from the counter 3471. By this adjustment, the data board 3473 gets information of the time slot at which the pulse generator 345 outputs an on-signal. Through the above adjustment of the timing, the slot position whose information is transferred to the data board 3473 coincides with the time slot where a photon is detected at photo-detectors 331, 332, 333, and 334 and the result is stored in the memory circuits 3481, 3482, 3483, and 3484.

FIG. 9B is a diagram showing an example of the data which is saved in the data board 3473. The slot positions are output values of the register 3472, and the results of photon detection are detection results of the photodetectors 331, 332, 333 and 334 which are stored in the memory circuits 3481, 3482, 3483, and 3484, respectively.

FIG. 9A, which is described earlier, shows the transmitted differential random numbers of two bits, and FIG. 9B shows the received random numbers. When a transmission and reception are accurately conducted, a transmitted random number of two bits exactly corresponds to the photon detection result. For example, at the slot position 0, since the differential random number of two bits is 00, the phase difference between the two successive pulses is 0, and the signal light is detected by the photodetector 331 if the signal light is input to the asymmetric Mach Zehnder interferometer 310, with the result that the memory circuit 3481 stores "1", as described with respect to FIGS. 1B and 4B. Other memory circuits store "0". Likewise, at the slot position 101, since the differential random number of two bits is 11, the phase difference between the two successive pulses is $3\pi/2$, and if the signal light is input to the asymmetric Mach Zehnder interferometer 320, the photodetector 334 detects a photon, and "1" is stored in the memory circuit 3484. Other memory circuits store. "0". At the slot position 205, since the differential random number of two bits is 10, the phase difference between the two successive pulses is $\pi$, and if the signal light is input to the asymmetric Mach Zehnder interferometer 310, the photodetector 332 detects a photon and "1" should be stored in the memory circuit 3482. However, in the example of FIG. 9B, because the signal light is input to the asymmetric Mach Zehnder interferometer 320, a photon is detected by the photodetector 333 at the probability of ½, and "1" is stored in the memory circuit 3483. Other memory circuits become "0". In this example on the slot 205, the random number cannot be accurately received. This may always occur because the division of photons by means of the coupler 302 is probabilistic. Apart from this, noises or eavesdropping may change the transmitted random numbers per se during transmission.

The information that has been collected in the data board 3473 includes information on the basis that is selected by the receiver 300 and random-number data that has been received. For example, when the photodetector 331 detects "1", the basis is $(0, \pi)$, and the random number of one bit is 0. When the photodetector 332 detects "1", the basis is $(0, \pi)$, and the random number of one bit is 1. When the photodetector 333 detects "1", the basis is $(\pi/2, 3\pi/2)$, and the random number of one bit is 0. When the photodetector 334 detects "1", the basis is $(\pi/2, 3\pi/2)$, and the random number of one bit is 1. The information on the received basis and which slot of the transmitted random-number train being detected are sent to the sender 1 by means of the general line 202. The sender 1 can judge from that information whether the signal-receiving basis coincides with the signal-transmitting basis, or not. Inconsistent slots are not adopted as data. The result is communicated to the recipient through the general line 202. In the example of FIG. 9B, data of the slot 205 is not adopted.

Through the above procedure, the sender 1 and the recipient 2 obtain a source data of cryptographic key to be shared with each other. In the following procedure, the sender 1 and the recipient 2 communicate with each other through the general line 202 to generate cryptographic key according to a generally known protocol (Non-patent Document 6). For example, the following procedure is conducted.

First, the recipient 2 sends the information on the slot position of the received random-number data and the receiving basis to the sender 1 through the general line 202. Next, the sender 1 notifies the recipient 2 of the slot positions where the transmission basis coincides with the receiving basis. Through this communication, the slot positions at which the transmission basis and the receiving basis coincide with each other are made clear. If there is no noise or eavesdropping, the sender and the recipient share random numbers at this time point for the time slots that the transmission basis and the receiving basis coincide with each other. However, as described with reference to FIG. 9, a so-called bit error exists due to the noises or eavesdropping. For that reason, parity is checked to conduct an error correction, and an error rate is calculated.

The parity check is conducted, for example, as follows: First, in the transmission and receiving, an appropriate number of slots are selected at random from the slots at which the bases coincide with each other, and exclusive OR (parity) of the random numbers is calculated by the sender and recipient independently. In the example of FIG. 9, the bases coincide with each other in only four slots 0, 101, 303 and 407. Therefore, the exclusive OR is calculated with respect to those four slots. That is, Expression (1) is obtained.

$$0 \oplus 1 \oplus 1 \oplus 1 = 1 \quad (1)$$

Next, the results are compared between the sender and the recipient through the general line 202, and if they are coincident with each other, then it is judged to be no bit error (parity check). In the example of FIG. 9, there is no bit error. Since the communication through the general line 202 may allow an eavesdropper to get one-bit information on parity check, information of one bit is thrown away from the shared random numbers. For example, the slot 407 is ignored in the following. In the parity check, when the parity does not coincide between the sender and the recipient, the number of slots to calculate an exclusive OR is reduced by half, and a similar parity check is conducted. The halving operation is repeated until the slot that causes the bit error is specified. If the slot that causes the bit error is specified, the bit is corrected, which is called error correction. In general, since there is the possibility of eavesdropping in the process through the general line 202, the amount of information that is communicated through the general line 202 is thrown away from the shared random-number data.

In the cryptographic-key generation using the single photons or the faint light as in the present invention, it has been known that the error rate is increased under an eavesdropping, based on the principle of the quantum mechanics. Therefore, the amount of eavesdropping is estimated from the calculated error rate. A process called "privacy amplification" is conducted according to the amount of eavesdropping. For example, logical operation that reduces the amount of information is predetermined between the sender 1 and the recipient 2 in advance, and the operation is conducted on the data that has been subjected to the error correction, and the amount of information that has been estimated to be eavesdropped on is reduced.

Through the above procedure, the cryptographic key that is shared by only the sender 1 and the recipient 2 is obtained.

Second Embodiment

In the first embodiment, optical fibers or PLC is used for the asymmetric Mach Zehnder interferometers 310 and 320, and the phase of the optical path-length difference between two arms is held constant by a temperature control. The optical path-length difference of the asymmetric Mach Zehnder interferometers 310 and 320 must accurately coincide with an amount corresponding to the clock rate, and the method of the first embodiment generally involves difficulty. It is reasonable that the optical delay line is disposed within the interferometer so as to adjust the optical path-length difference. Also, it is difficult to make the phase difference between the two arms of the asymmetric Mach Zehnder interferometer constant by only the temperature control as the asymmetry is increased more. Therefore, it is reasonable that the optical path-length is mechanically controlled with a feedback loop against the fluctuation of the phase.

Figure 10:
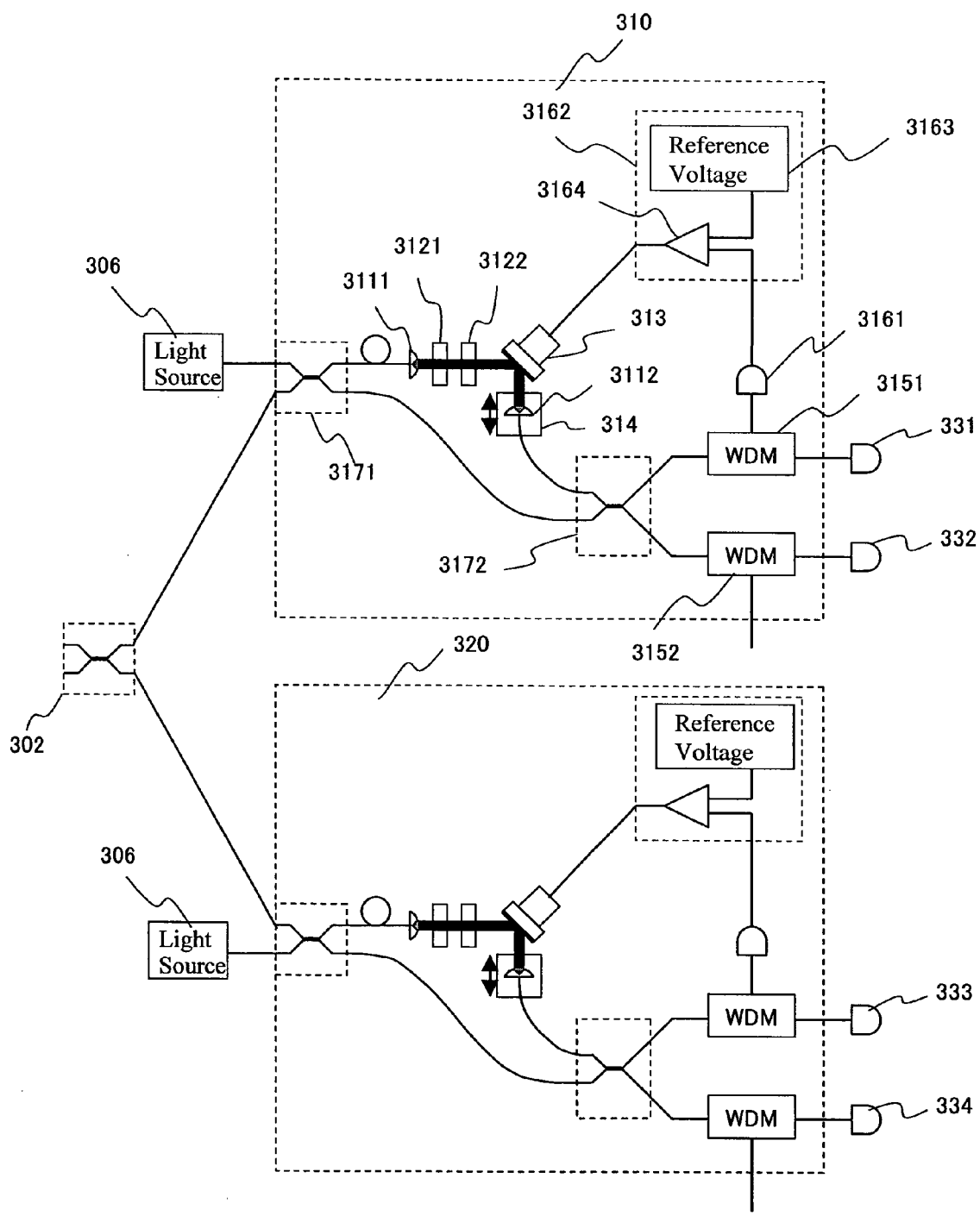
FIG. 10 is a block diagram showing the structure of asymmetric Mach Zehnder interferometers 310 and 320 that make it possible to adjust an optical path length by means of an optical delay line within the interferometer and to perform feedback control against the fluctuation of a phase difference between two arms.

FIG. 10 is a block diagram showing the structure of the asymmetric Mach Zehnder interferometers 310 and 320 that make it possible to adjust a difference in optical path lengths by means of an optical delay line within the interferometer and to control the optical path length with a feedback loop against the fluctuation of phase. This embodiment is identical with the first embodiment in that the signal light from the transmitter 100 passes through the coupler 302 having branching ratio of 50:50, and then enters the asymmetric Mach Zehnder interferometers 310 and 320. Since the asymmetric Mach Zehnder interferometers 310 and 320 are identical in structure with each other, only the asymmetric Mach Zehnder interferometer 310 will be described in more detail below.

This embodiment is identical with the first embodiment in that the asymmetric Mach Zehnder interferometer 310 is made up of the two couplers 3171 and 3172. The signal light that has been introduced into the asymmetric Mach Zehnder interferometer 310 is split into two optical paths by the first coupler 3171. One of the optical paths includes an optical path using collimator lenses 3111 and 3112 and having a free space between those collimator lenses. Another optical path is connected directly by an optical fiber. When one lens in the optical path including the free space, for example, the lens 3112 is located at a stage 314 and the position of the lens 3112 is movable, the asymmetry of the asymmetric Mach Zehnder interferometer can be arbitrarily adjusted. The phase of the optical path is controlled with a piezoelectric actuator 313. In this second embodiment, a simple structure is described in which a mirror with 90° reflection is attached to the piezoelectric actuator 313. Alternatively, a 180° folding structure using a corner mirror may be applicable. A fiber portion other than the free space portion is formed of a normal fiber that hardly has birefringence, but a slightly remaining birefringence is compensated by a λ/4 plate 3121 and a λ/2 plate 3122.

In the cryptographic-key generation communication system based on the principle of the quantum mechanics as in the present invention, since its purpose is to prevent eavesdropping, the signal light cannot be utilized for the purpose other than the signal detection. For that reason, a light source 306 is employed for monitoring the phase difference in the asymmetric Mach Zehnder interferometer. The wavelength of the reference light (a light from the light source 306) is different from the signal light so that the former is distinguishable from the latter. When the signal light is of the 1.55 µm band, 1.55 µm band can be used for the reference light as in the dense wavelength-division multiplexing, or the wavelength of 1.3 µm can be used. The reference light is split from the signal light with WDM coupler 3151. Plural WDM couplers are disposed in series for 3151 such that the reference light is not mixed into the detector 331 as with the WDM coupler 350 in FIG. 6. The reference light is converted into a voltage signal by the photodetector 3161, and then fed back to the piezoelectric actuator 313 through the feedback control circuit 3162 so that the output voltage of the photodetector 3161 is kept constant.

The feedback circuit 3162 in FIG. 10 is a relatively simple structure, and includes a reference-voltage generator 3163 and a differential amplifier 3164. There is a possibility that various offset components are mixed together because the intensity of the reference light is monitored as a DC voltage. In order to prevent the above, there is a method in which the piezoelectric actuator 313 is driven by a constant frequency with very small amplitude, and the frequency component is monitored. In this second embodiment, only the feedback control by the piezoelectric actuator 313 is performed, but if the asymmetric Mach Zehnder interferometer 310 is controlled in temperature, the amount of feedback is reduced, and the stability of the interferometer becomes high.

In order to achieve accurate signal detection, it is necessary that the photodetectors 331 and 332 detect the signal with the equal probability. For that reason, the photodetectors 331 and 332 having the same characteristics are employed. Also, the WDM coupler 3152 that has identical characteristics with the WDM coupler 3151 is inserted at a position symmetrical with the WDM coupler 3151. Because the optical path of the asymmetric Mach Zehnder interferometer is asymmetric in the structure, the loss is also asymmetric. For that reason, the branching ratio of the coupler 3171 is so adjusted as to be slightly shifted from 50:50. The coupler 3172 should be preferably 50:50.

Third Embodiment

Figure 11:
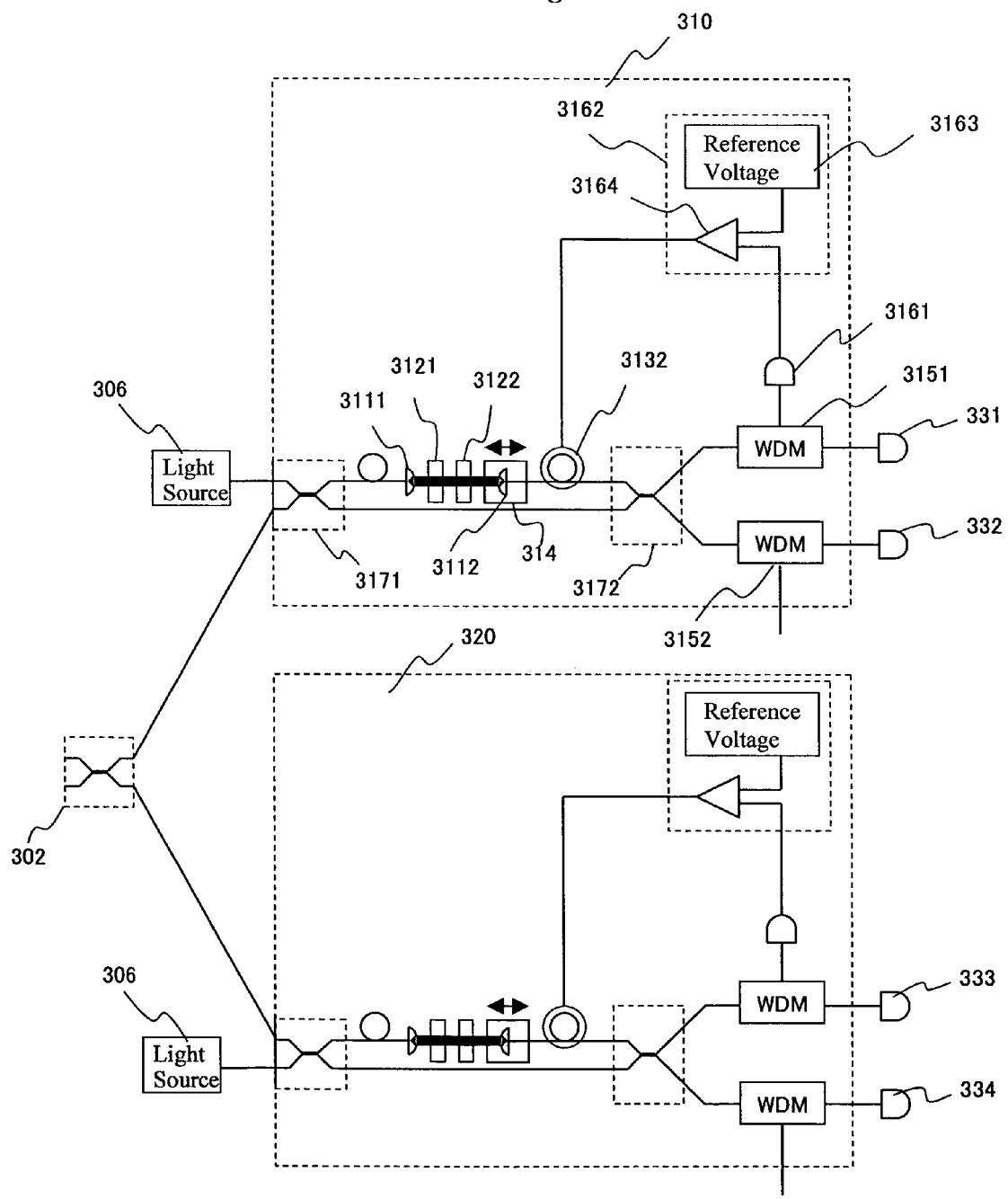
FIG. 11 is a block diagram showing the structure of asymmetric Mach Zehnder interferometers 310 and 320 that shorten a free space portion, compared with FIG. 10, while enabling the adjustment of asymmetry in the asymmetric Mach Zehnder interferometers in an embodiment 2.

FIG. 11 is a block diagram showing the structure of the asymmetric Mach Zehnder interferometers 310 and 320 that shorten the free space portions of the asymmetric Mach Zehnder interferometers 310 and 320 while enabling the adjustment of asymmetry. In FIG. 11, the same parts as the structural elements shown in FIG. 10 are designated by the same reference numbers. It is preferable that the free space portion is reduced as much as possible from the viewpoint that the operation should be stabilized for a long time. In FIG. 10, the phase of the optical path is controlled by means of the piezoelectric actuator 313 to which a 90° reflection mirror is attached. On the contrary, in FIG. 11, the phase of the optical path is controlled by means of a ring type piezoelectric device 3132 on which an optical fiber is wound in the rear of the collimator lens 3112. The circumference of the ring-type piezoelectric device 3132 is increased or decreased by applying the voltage, and therefore, the fiber length is increased or decreased. This third embodiment is identical with the second embodiment in that the piezoelectric device is used for the feedback control of the phase. A difference between the second and third embodiments resides where the piezoelectric device is disposed, i.e., in the free space portion in the second embodiment or in a fiber portion in the third embodiment. This third embodiment is advantageous in the stabilization for a long time since the free space portion can be reduced.

Fourth Embodiment

In the second and third embodiments, the additional light source 306 is used as reference in order to stabilize the phase difference of the optical paths of the asymmetric Mach Zehnder interferometers 310 and 320. However, in the first embodiment, a light other than the signal light is used for transmission of the clock. That is, in order to transmit the clock to the receiver 300, a light source 141 is located in the transmitter 100, and the light of the light source 141 is modulated with the substantially original shape of the output clock from the clock generator 160, and then transmitted to the receiver 300. The clock signal can be used as the reference light for stabilizing the phase difference between the two arms of the asymmetric Mach Zehnder interferometers.

Figure 12:
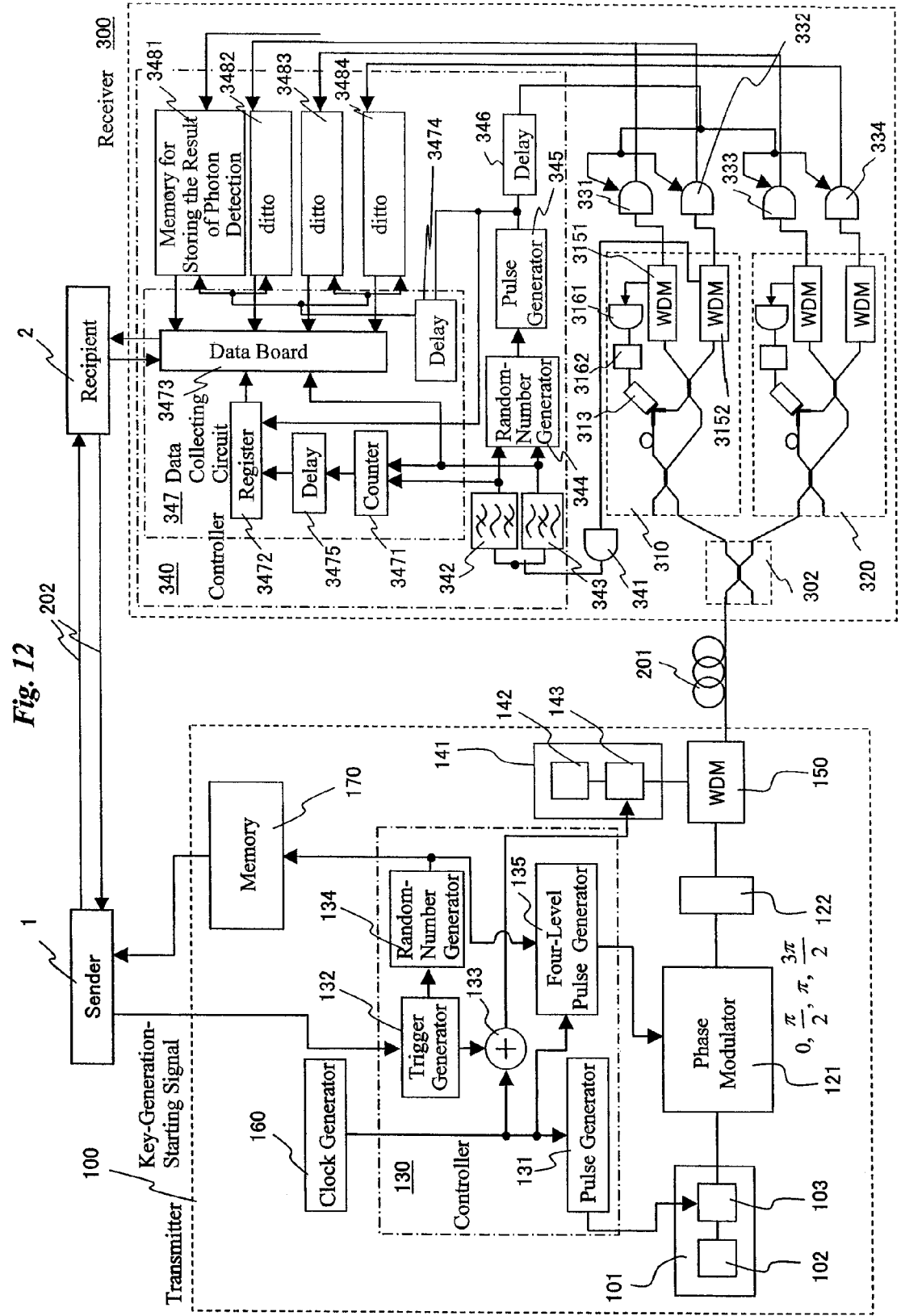
FIG. 12 is a block diagram showing the structure of a communication system using a clock light that is transmitted from a transmitter 100 to monitor the asymmetric Mach Zehnder interferometer.

FIG. 12 is a block diagram showing the structure of a communication system, using a clock light which is transmitted from the transmitter 100, as a reference light of the asymmetric Mach Zehnder interferometer. In FIG. 12, the same parts as the structural elements of FIG. 5 or the parts having the same functions are designated by the same reference numbers. The asymmetric Mach Zehnder interferometers 310 and 320 are structured as described in the second embodiment (FIG. 10), and the same parts or the parts having the same functions are designated by identical reference numbers although the reference light source 306 is removed.

In the structure of FIG. 5, the clock light is split from the signal light by the WDM coupler 350 before entering the asymmetric Mach Zehnder interferometers 310 and 320 in the receiver 300. In the structure of FIG. 12, the clock light is split with the WDM coupler 3152 after passing through the asymmetric Mach Zehnder interferometer 310. The structure other than a place at which the WDM coupler is located is identical. In FIGS. 10 and 11, although the reference light that has been split by the WDM coupler 3152 is not used, the WDM coupler 3152 in FIG. 12 plays the role of the WDM coupler 350 in FIG. 5. The clock signal that has been split from the WDM coupler 3151 is used as the reference light for stabilizing the asymmetric Mach Zehnder interferometer 310 as in FIGS. 10 and 11. The clock signal is converted into an electric signal by the photodetector 3161, and then fed back to the piezoelectric actuator 313 through the feedback control circuit 3162.

In FIG. 12, the actual clock light that is transmitted from the transmitter 100 is used for the reference light of the asymmetric Mach Zehnder interferometers 310 and 320. The clock signal is modulated at the clock frequency of the clock generator 160, and also has the trigger signal that is supplied from the trigger generator 132. This situation is different from that of the light source 306 used in FIGS. 10 and 11, and the situation can be regarded as an inclusion of noises. However, the information on the clock, the trigger, and the reference light can be split by the filter because the information uses the frequency bands different from each other, and has no problem as the reference light. For example, if the dc component is used for reference of the asymmetric Mach Zehnder interferometers 310 and 320, a low pass filter is located in the feedback control circuit 3162. In this case, the trigger signal that is supplied from the trigger generator 132 in the transmitter 100 should be composed of the frequencies except dc and the clock frequency. Another example is to use the clock frequency for monitoring the asymmetric Mach Zehnder interferometer. In this case, the feedback circuit 3162, equipped with a band pass filter, extracts the clock frequency and rectifies it with a diode. As a result, the reference signal is converted into the dc voltage, and the subsequent operation is identical with the case of the dc component. In this case, the trigger signal is allowed to include a dc component because the dc component per se is not used for monitoring the asymmetric Mach Zehnder interferometers 310 and 320.

Different from the case of FIG. 5, the clock light is split from the signal light after passing through the asymmetric Mach Zehnder interferometers in this fourth embodiment, and therefore the intensity of the clock light fluctuates with a fluctuation of the phase difference between the two arms of the asymmetric Mach Zehnder interferometers. However, since the feedback control is conducted so that the phase difference is held constant, the intensity of the clock light is held substantially constant.

Fifth Embodiment

In the above embodiments, two asymmetric Mach Zehnder interferometers 310 and 320 are disposed within the receiver 300, and the phase of the optical path-length difference is held constant by a feedback control using the piezoelectric device 313 or 3132 in the asymmetric Mach Zehnder interferometers 310 and 320. The piezoelectric devices 313 and 3132 not only can hold the phase constant, but also can modulate the phase. A difference between the asymmetric Mach Zehnder interferometers 310 and 320 is that the phase difference between the two arms of the interferometers is 0 or $\pi/2$. When the piezoelectric actuator 313 is modulated at random by $\pi/2$, the receiver 300 can be constituted by only one asymmetric Mach Zehnder interferometer. The piezoelectric device cannot run at a high speed. However, since the role of the modulation is to modulate the receiving basis, it is unnecessary to always modulate the receiving basis at a receiving rate, and the purpose can be achieved even by the low-speed modulation.

Figure 13:
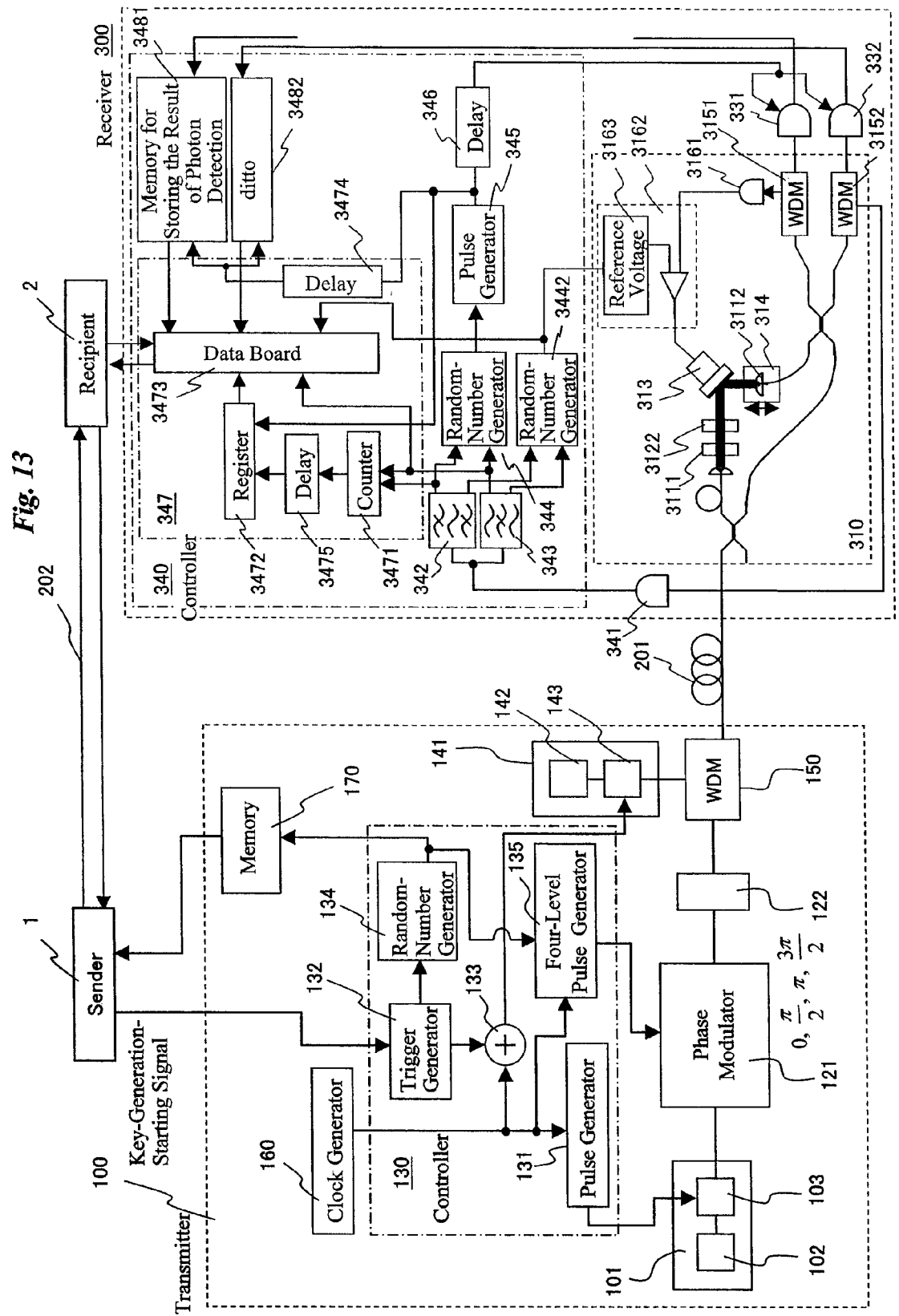
FIG. 13 is a block diagram showing an embodiment in which a receiver 300 is formed of one asymmetric Mach Zehnder interferometer, one arm of which is phase-modulated by 0 and $\pi/2$.

FIG. 13 is a block diagram showing an embodiment in which a receiver 300 is formed of one asymmetric Mach Zehnder interferometer. The phase of an optical path-length difference between the two arms of the asymmetric Mach Zehnder interferometer is modulated with 0 and $\pi/2$. As is apparent from the comparison with FIG. 12, the receiver 300 in FIG. 13 contains only one asymmetric Mach Zehnder interferometer 310, and therefore only two photodetectors 331 and 332 for signal light, and only two memory circuits 3481 and 3482 to store the result of photon detection. In order to modulate the piezoelectric actuator 313 by the amplitude $\pi/2$, a voltage reference 3163 within the feedback control circuit 3162 takes binary values. The binary values need to be at random, and therefore the random generator 3442 is provided. The random generator 3442 is synchronized with the clock that has passed through the band pass filter 342 as with the random generator 344, and is initiated with the trigger signal that has passed through the filter 343. It transmits the binary random numbers corresponding to the phase differences 0 and $\pi/2$ to the voltage reference 3163. In addition, the binary random numbers are transmitted to the data board 3473 within the data collecting circuit 347.

Figure 14:
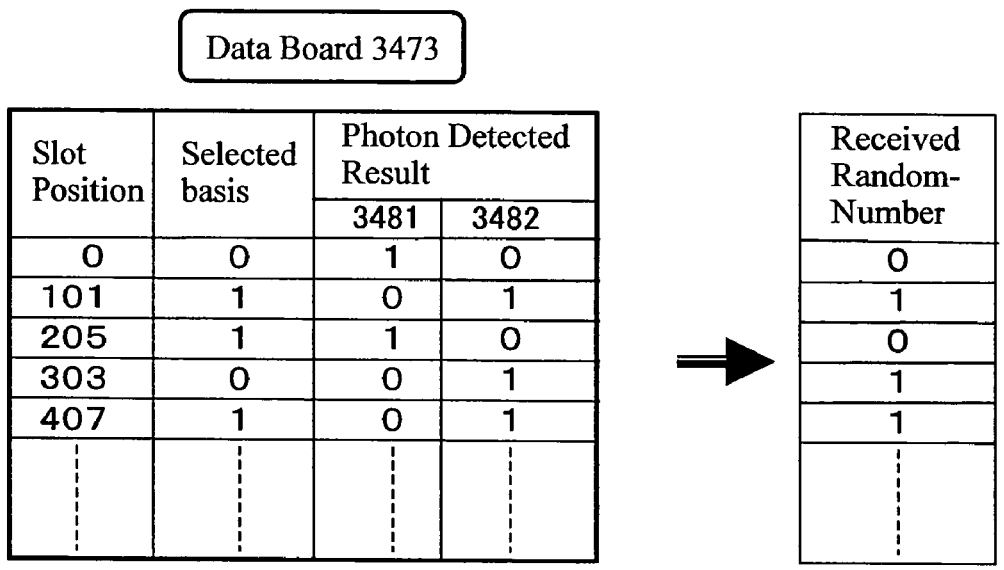
FIG. 14 is a diagram showing an example of data saved in the data board 3473 in an embodiment 5.

FIG. 14 is a diagram showing an example of data saved in the data board 3473 in this fifth embodiment, compared with FIG. 9B. In this example, the basis selection 0 indicates that the reference voltage of the phase difference 0 is selected, and the basis selection 1 indicates that the reference voltage of the phase difference $\pi/2$ is selected, respectively. As is apparent from comparison with FIG. 9B, FIG. 14 provides the same result as FIG. 9B, combining the basis selection with the photon detection result of the memory circuits 3481 and 3482.

In the structure of FIG. 13, since the WDM coupler 3151 for clock extraction is located in the rear of the asymmetric Mach Zehnder interferometer 310, the intensity of the clock signal depends on the value of the reference voltage 3163. A change in the intensity causes the system error of the timing with respect to the random-number generators 344, 3442, and the data collecting circuit 347, but the system error can be eliminated by correcting the timing in response to the output of the random-number generator 3442.

Six Embodiment

In FIGS. 5 to 13, the phase of the optical path-length difference of the asymmetric Mach Zehnder interferometers is observed using the reference light, whose wavelength is different from that of the signal light. For that reason, the light source 102 of the continuous light, which is the source of the signal light, and the light source 142 of the continuous light, which is the source of the reference light, use independent light sources. When distributed-feedback (DFB) lasers are used for the signal light and the reference light (clock light), the operating wavelength varies by about 0.1 nm/° C. due to the environmental temperature. In other words, it corresponds to 12.5 GHz/° C. for a wavelength of 1.55 μm. For example, when a pulse train with a clock rate of 100 MHz is intended to interfere between consecutive pulses, the line width of the operating wavelength must be less than 10 MHz which is one digit smaller than 100 MHz. In other words, the temperature control of the DFB lasers must be executed with a precision of $1/1000°$ C. or lower.

It is actually difficult to control the temperature with the above precision. This value is requested for the case where two DFB lasers 102 and 142 are controlled independently in temperature.

Figure 15:
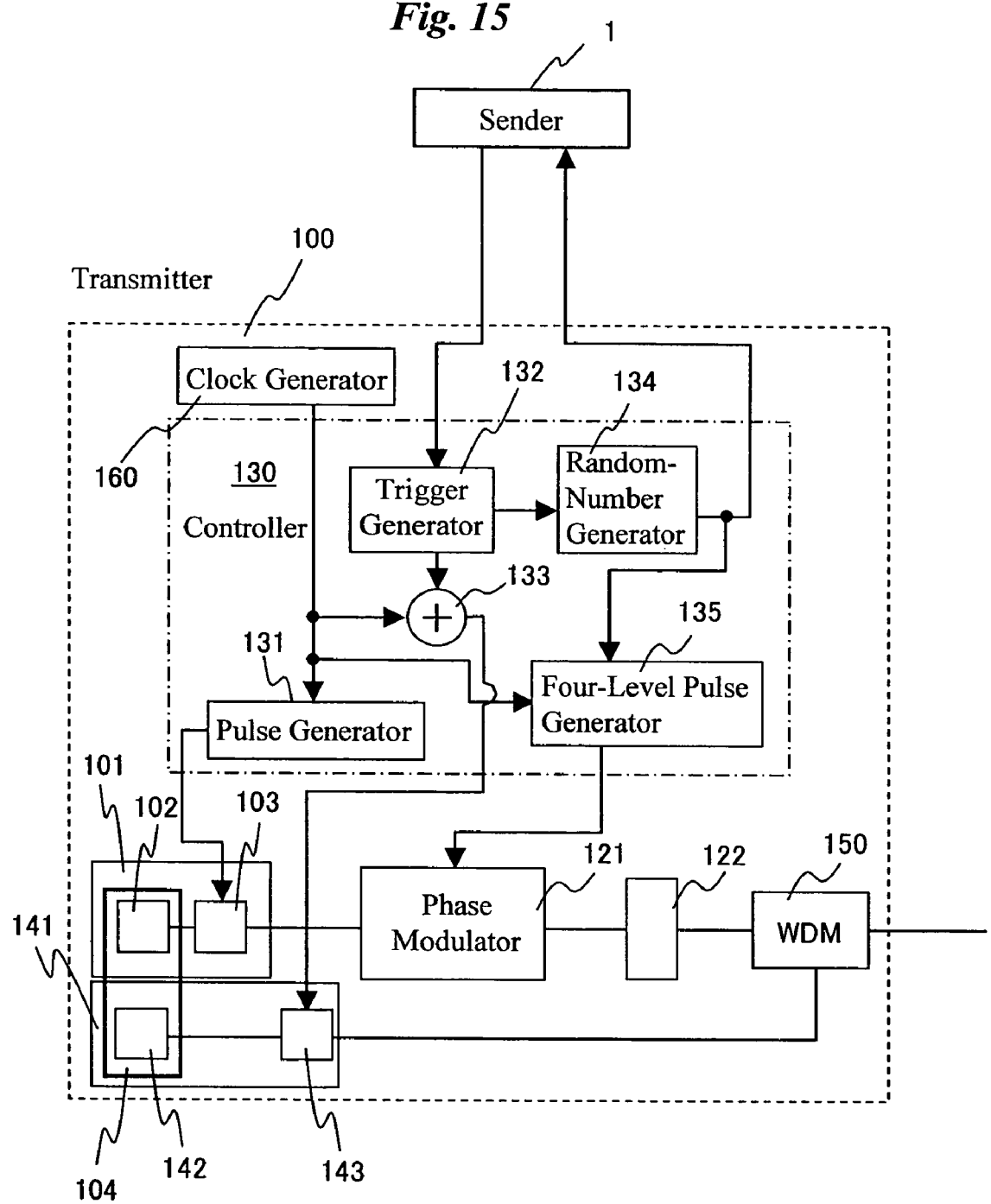
FIG. 15 is a block diagram showing the structure of a transmitter in which two lasers are disposed in the same constant-temperature holder.

On the other hand, when two lasers are formed on the same chip, or even if the chips are separate, when those chips are located on the same constant-temperature holder so that the relative temperature of those two lasers is held 0 or constant, then the asymmetric Mach Zehnder interferometer operates stably with respect to the signal light by the stabilization with respect to the reference light even if the absolute temperature is not sufficiently stabilized with the above precision. FIG. 15 is a block diagram showing the structure of the transmitter 100 in which two lasers are disposed in the same constant-temperature holder from the above viewpoint. The light sources 101 and 141 are disposed adjacent to each other, and the cw light source 102 and 142 are held on the same constant-temperature holder 104. Other structures are identical with those in FIGS. 5, 12 and 13.

As described so far, the interval of the paired pulses is reduced as much as possible, and accordingly, the asymmetry of the asymmetric Mach Zehnder interferometer within the receiver for interfering the paired pulses with each other can be reduced. As a result, environmental fluctuations hardly affect the asymmetric Mach Zehnder interferometer, and the stable asymmetric Mach Zehnder interferometer can be realized.

When the clock rate of the transmitter side is sufficiently larger than the average detection rate of the receiver, the high coherence of the laser beam can be utilized. In this case, paired pulses can be generated directly in a light source within a coherence time, and an asymmetric Mach Zehnder interferometer or the like is not required in the transmitter.

In addition, since an additional random-number generator is located within the receiver, eavesdropping during the signal transmission becomes more difficult. Also, the basis selection due to the simple beam splitter is perfectly at random according to the physical law. The quantum mechanical cryptographic key distribution system whose security has been unconditionally proved is perfectly realized in the method of phase modulation.

Since a demand for secure communications is always high although there are various levels, i.e., from state secrets to general personal information. From this point of view, the cryptographic-key-generation communication system of the present invention is useful.

What is claimed is:

1. A method of transmitting random numbers to be used for generating a cryptographic key from a transmitter of a sender's apparatus to a receiver of a recipient's apparatus via an optical fiber, the cryptographic key being applied to data transmission on a communication line connecting the sender's apparatus and the recipient's apparatus, the method comprising the steps of:
    starting generation of two-bit random numbers in synchronization with transmission clock in the transmitter, in response to an instruction from the sender's apparatus;
    generating a train of phase-modulated signal light modulated according to the value of the two-bit random numbers in synchronization with the transmission clock in the transmitter;
    transmitting the train of phase-modulated signal light at a single photon level and a trigger light indicative of beginning of random number transmission from the transmitter to the receiver via the optical fiber;
    storing the random numbers at each slot position and associated slot position numbers into a first memory in the transmitter;
    receiving the phase-modulated signal light in synchronization with the transmission clock and the trigger light in the receiver;
    starting generation of slot position numbers in the receiver in response to the trigger light;
    selecting time slots sporadically at random at an average rate lower than that of the transmission clock, and detecting random numbers at the selected time slots from the phase-modulated signal light;
    storing the random numbers detected at the sporadically selected time slots and the associated slot position numbers into a second memory in the receiver; and
    communicating between the sender's apparatus and the recipient's apparatus through the communication line to determine a group of secret random numbers to be used in a cipher system as a cryptographic key, from the random numbers stored in common in both the first and second memories.

2. The method according to claim 1, wherein the transmitter transmits clock light synchronized with the transmission clock together with the phase-modulated signal light in a form of wavelength division multiplexing, and
    the receiver generates the slot position numbers in synchronization with the received clock light.

3. The method according to claim 1, wherein the transmitter generates the phase-modulated signal light so as to yield phase differences of 0, $\pi/2$, $\pi$ and $3\pi/2$ between a pair of successive signal lights in accordance with values of "00", "01", "10" and '11" of the two-bit random numbers, respectively.

4. The method according to claim 1, wherein the transmitter generates the phase-modulated signal lights phase-shifted by 0, $\pi/2$, $\pi$ and $3\pi/2$ in accordance with the values of '00", '01", "10" and '11" of the two-bit random numbers, respectively.

5. The method according to claim 3,
    wherein the recipient's apparatus informs the sender's apparatus of slot position numbers stored in the second memory and signal-receiving bases indicative of whether the random number detected at each of the selected time slots belongs to a group of phases of 0 and $\pi$, or a group of phases of $\pi/2$ and $\pi/2$, and
    the sender's apparatus checks the random numbers stored in the first memory in order to confirm whether a signal-transmitting basis which is a group of signal phases of 0 and $\pi$, or a group of phases of $\pi/2$ and $3\pi/2$, matches the informed signal-receiving basis at each of the informed slot positions, and notifies the recipient's apparatus of slot position numbers corresponding to unmatched signal-transmitting/receiving bases, and eliminates the random numbers having the notified slot position numbers from a candidate for the group of secret random numbers.

6. The method according to claim 4,
    wherein the recipient's apparatus informs the sender's apparatus of slot position numbers stored in the second memory and signal-receiving bases indicative of whether the random number detected at each of the selected time slots belongs to a group of phases of 0 and $\pi$, or a group of phases of $\pi/2$ and $3\pi/2$, and
    the sender's apparatus checks the random numbers stored in the first memory in order to confirm whether a signal-transmitting basis which is a group of signal phase 0 and $\pi$ or a group of phases of $\pi/2$ and $3\pi/2$, matches the informed signal-receiving basis at each of the informed slot positions, and notifies the recipient's apparatus of slot position numbers corresponding to unmatched signal-transmitting/receiving bases, and eliminates the random numbers having the notified slot position numbers from a candidate for the group of secret random numbers.

7. The method according to claim 5, wherein the receiver detects the phase-modulated signal light by a first pair of photo-detectors detecting the signal light phase-modulated by 0 or $\pi$ and a second pair of photo-detectors detecting the signal light phase-modulated by $\pi/2$ or $3\pi/2$, and stores bit information indicating a status of an output for each of the photo-detectors together with the slot position numbers into the second memory, and
    the recipient's apparatus informs the sender's apparatus, as the signal-receiving basis, of bit information indicative which of the first pair and the second pair detects the signal light at the selected time slot.

8. The method according to claim 6, wherein the receiver detects the phase-modulated signal light by a first pair of photo-detectors detecting the signal light phase-modulated by 0 or $\pi$ and a second pair of photo-detectors detecting the signal light phase-modulated by $\pi/2$ or $3\pi/2$ and stores bit information indicating a status of an output for each of the photo-detectors together with the slot position numbers into the second memory, and
    the recipient's apparatus informs the sender's apparatus, as the signal-receiving basis, of bit information indicative which of the first and second pairs detects the signal light at the selected time slot.

9. A communication system for transmitting random numbers to be used for generating a cryptographic key from a transmitter of a sender's apparatus to a receiver of a recipient's apparatus via an optical fiber, the cryptographic key being applied to data transmission on a communication line connecting the sender's apparatus and the recipient's apparatus,
    wherein the transmitter comprises:
    a random number generator which starts to generate two-bit random numbers in synchronization with transmission clock in response to an instruction from a trigger generator;
    a modulated signal light generator which generates a train of phase-modulated signal light modulated according to the value of the two-bit random numbers in synchronization with the transmission clock;

a multiplexer which multiplexes the train of phase-modulated signal light at a single photon level and a trigger light indicative of beginning of random number transmission and transmitting the multiplexed light to the optical fiber; and a first memory which stores the random numbers at each slot position and associated slot position numbers; and wherein the receiver comprises:

a demultiplexer which separates the trigger light from the phase-modulated signal light received through the optical fiber;

a counter which starts to generate slot position numbers in synchronization with the transmission clock in response to the trigger light; and a detecting unit which detects random numbers sporadically at random at an average rate lower than that of the transmission clock from the phase-modulated signal light; and a second memory which stores the detected random numbers and the associated slot numbers of the specific time slots; and wherein the sender's apparatus and the recipient's apparatus communicate through the communication line to determine a group of secret random numbers to be used in a cipher system as the cryptographic key, from the random numbers stored in common in both the first and second memories.

10. The communication system according to claim 9, wherein the transmitter generates the trigger light as trigger-and-clock light by a clock light generator for generating clock light in synchronization with the transmission clock, the trigger-and-clock light having a wavelength different from that of the phase modulated signal light, the multiplexer multiplexes the trigger-and-clock light with the phase modulated signal light in a form of wavelength division multiplexing, and the receiver generates the slot position numbers in synchronization with a clock component in the received trigger-and-clock light.

11. The communication system according to claim 9, wherein the modulated signal light generator (101, 121, 122) comprises:

an interferometer which converts signal light generated from a light source into a pair of successive signal light; and a phase modulator which modulates the output of the interferometer so as to yield phase differences of 0, $\pi/2$, $\pi$ and $3\pi/2$ between the pair of successive signal light in accordance with values of "00", "01", "10" and "11" of the two-bit random numbers, respectively.

12. The communication system according to claim 9, wherein the modulated signal light generator comprises:

a signal light source which generates a train of signal light in synchronization with the transmission clock; and a phase modulator which modulates each signal light output from the signal light source so as to give a phase shift by 0, $\pi/2$, $\pi$ and $3\pi/2$ in accordance with the values of "00", "01", "10" and "11" of the two-bit random numbers, respectively.

13. The communication system according to claim 9, wherein the detecting unit comprises:

a beam splitter which splits the train of phase-modulated signal light output from the demultiplexer to first and second optical paths;

a first interferometer which outputs a pair of interfered optical signal indicating whether the signal light on the first optical path is phase-modulated by 0 or $\pi$, respectively;

a second interferometer which outputs a pair of interfered optical signal indicating whether the signal light on the second optical path is phase-modulated by $\pi/2$ or $3\pi/2$, respectively; and two pairs of photo-detectors which detect status of outputs from the first and second interferometers, respectively, at the specific time slots;

wherein the second memory stores bit information, indicative of the status of the outputs from the photo-detectors, as the detected random numbers for the associated slot numbers.

14. The communication system according to claim 10, wherein the detecting unit comprises:

a beam splitter which splits the train of phase-modulated signal light output from the demultiplexer to first and second optical paths;

a first interferometer which outputs a pair of interfered optical signal indicating whether the signal light on the first optical path is phase-modulated by 0 or $\pi$, respectively;

a second interferometer which outputs a pair of interfered optical signal indicating whether the signal light on the second optical path is phase-modulated by $\pi/2$ or $3\pi/2$, respectively; and two pairs of photo-detectors which detect the status of the outputs from the first and second interferometers, respectively, at the specific time slots;

wherein the second memory stores bit information, indicative of the status of the outputs from the photo-detectors, as the detected random numbers for the associated slot numbers.

15. The communication system according to claim 13, wherein each of the first and second interferometers is provided with means for adjusting the optical path-length difference between two internal optical paths thereof.

16. The communication system according to claim 14, wherein each of the first and second interferometers is provided with means for adjusting the optical path-length difference between two internal optical paths thereof.

17. The communication system according to claim 13, wherein the recipient's apparatus includes means for informing the sender's apparatus of slot position numbers stored in the second memory and signal-receiving bases indicative of whether the random number detected at each of the specific time slots belongs to a group of phases of 0 and $\pi$, or a group of phases of $\pi/2$ and $3\pi/2$, and the sender's apparatus includes means for checking random numbers stored in the first memory in order to confirm whether a signal-transmitting basis which is a group of signal phases of 0 and $\pi$ or a group of signal phases of $\pi/2$ and $3\pi/2$, matches the informed signal-receiving basis at each of the informed slot positions, and notifying the recipient's apparatus of slot position numbers corresponding to unmatched signal-transmitting/receiving bases, and eliminates the random numbers having the notified slot position numbers from a candidate for the group of secret random numbers.

18. The communication system according to claim 14, wherein the recipient's apparatus includes means for informing the sender's apparatus of slot position numbers stored in the second memory and signal-receiving bases indicative of whether the random number detected at each of the specific time slots belongs to a group of phases of 0 and $\pi$, or a group of phases of $\pi/2$ and $3\pi/2$, and the sender's apparatus includes means for checking random numbers stored in the first memory in order to confirm whether a signal-transmitting basis, i.e., a group of signal phases of 0 and $\pi$ or a group of signal phases of $\pi/2$ and $3\pi/2$, matches the informed signal-receiving basis at each of the informed slot positions, and notifying the recipient's apparatus of slot position numbers corresponding to unmatched signal-transmitting/receiving bases, and eliminates the random numbers having the notified slot position numbers from a candidate for the group of secret random numbers.

* * * * *

UNITED STATES PATENT AND TRADEMARK OFFICE
CERTIFICATE OF CORRECTION

PATENT NO. : 7,596,322 B2
APPLICATION NO. : 11/350086
DATED : September 29, 2009
INVENTOR(S) : Tomaru et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twenty-eighth Day of September, 2010

David J. Kappos
*Director of the United States Patent and Trademark Office*